US012001752B1

(12) United States Patent
Duque et al.

(10) Patent No.: US 12,001,752 B1
(45) Date of Patent: Jun. 4, 2024

(54) VOICE ASSISTANCE IN VIRTUAL REALITY ENVIRONMENTS AND AUGMENTED REALITY ENVIRONMENTS

(71) Applicant: Capital One Services, LLC, McLean, VA (US)

(72) Inventors: Julian Duque, Arlington, VA (US); Tania Cruz Morales, Washington, DC (US); Kevin M. Lowe, Richmond, VA (US); Helen Temesghen-Blount, Washington, DC (US); Luis Catacora, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/165,795

(22) Filed: Feb. 7, 2023

(51) Int. Cl.
*G06F 3/16* (2006.01)
*G10L 13/00* (2006.01)

(52) U.S. Cl.
CPC ............... *G06F 3/16* (2013.01); *G10L 13/00* (2013.01)

(58) Field of Classification Search
CPC .................................. G06F 3/16; G10L 13/00
See application file for complete search history.

(56) References Cited

U.S. PATENT DOCUMENTS

| 5,900,849 | A | * | 5/1999 | Gallery | ................ | G02B 27/017 345/7 |
| 2008/0169929 | A1 | * | 7/2008 | Albertson | ........ | G08B 13/19602 340/573.1 |
| 2018/0061276 | A1 | * | 3/2018 | Baca | .................... | H04N 13/207 |

OTHER PUBLICATIONS

Martez E. Mott, et al., "I just went into it assuming that I wouldn't be able to have the full experience," The 22nd International ACM SIGACCESS Conference on Computers and Accessibility (ASSETS '20) (Oct. 26-28, 2020, Virtual Event, Greece), Association for Computing Machinery, 13 pages.

(Continued)

*Primary Examiner* — Andrey Belousov
(74) *Attorney, Agent, or Firm* — Harrity & Harrity, LLP

(57) ABSTRACT

In some implementations, a voice assistance device may receive an indication of a visualization change associated with the virtual or augmented reality environment. The voice assistance device may determine that a change value, calculated based on the indication of the visualization change, satisfies a relevance threshold. The voice assistance device may apply, based on the indicator of change satisfying the relevance threshold, a description model to determine at least one sentence describing the virtual or augmented reality environment. The voice assistance device may apply a text-to-speech model to the at least one sentence to generate a digital sound signal and may transmit, to an output component, the digital sound signal.

20 Claims, 22 Drawing Sheets

(56) References Cited

OTHER PUBLICATIONS

Filipe Fernandes, et al., "Accessibility in the Metaverse: Are We Prepared?" System Engineering and Computer Science Department, Federal University of Rio de Janeiro (Rio de Janeiro, Brazil), 7 pages.

David W. Schloerb, et al., "BlindAid: Virtual Environment System for Self-reliant Trip Planning and Orientation and Mobility Training," IEEE Haptics Symposium 2010 (Mar. 25-26, 2010, Waltham, Massachusetts), pp. 363-370.

Gareth R. White, et al., "Toward Accessible 3D Virtual Environments for the Blind and Visually Impaired," DIMEA 08 (Sep. 10-12, 2008, Athens, Greece), Association for Computing Machinery, 8 pages.

Jean-Marc Seigneur, et al., "How should metaverse augment humans with disabilities?" 13th Augmented Human International Conference Proceedings (2022, Canada) Association for Computing Machinery, 9 pages.

\* cited by examiner

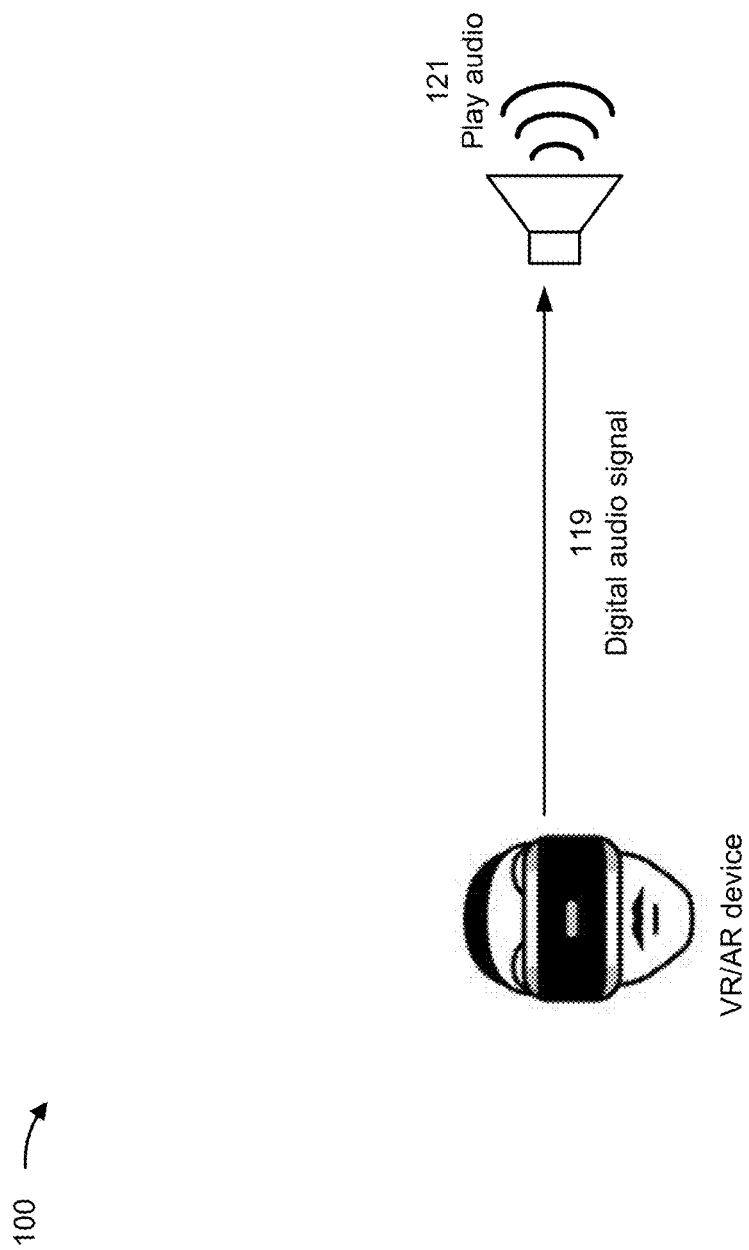

VOICE ASSISTANCE IN VIRTUAL REALITY ENVIRONMENTS AND AUGMENTED REALITY ENVIRONMENTS

BACKGROUND

Virtual reality environments generally use pose tracking and near-eye displays (e.g., Meta® 's Oculus® headsets) to provide an immersive feel to a user. Augmented reality environments use the physical world as a backdrop with computer-generated enhancements (e.g., visual and audio overlays, among other examples).

SUMMARY

Some implementations described herein relate to a system for providing voice assistance in a virtual or augmented reality environment. The system may include one or more memories and one or more processors communicatively coupled to the one or more memories. The one or more processors may be configured to receive a first indication of a first visualization associated with the virtual or augmented reality environment. The one or more processors may be configured to receive a second indication of a second visualization, subsequent to the first visualization, associated with the virtual or augmented reality environment. The one or more processors may be configured to determine that an indicator of change from the first visualization to the second visualization satisfies a relevance threshold. The one or more processors may be configured to apply an image model, based on the indicator of change satisfying the relevance threshold, to determine one or more string descriptors for the second visualization. The one or more processors may be configured to apply a language model to the one or more string descriptors to generate at least one sentence. The one or more processors may be configured to apply a text-to-speech model to the at least one sentence to generate a digital sound signal. The one or more processors may be configured to transmit the digital sound signal to an output component.

Some implementations described herein relate to a method of providing voice assistance in a virtual or augmented reality environment. The method may include receiving, at a voice assistance device, an indication of a visualization change associated with the virtual or augmented reality environment. The method may include determining, at the voice assistance device, that a change value, calculated based on the indication of the visualization change, satisfies a relevance threshold. The method may include applying, at the voice assistance device and based on the indicator of change satisfying the relevance threshold, a description model to determine at least one sentence describing the virtual or augmented reality environment. The method may include applying a text-to-speech model to the at least one sentence to generate a digital sound signal. The method may include transmitting, to an output component, the digital sound signal.

Some implementations described herein relate to a non-transitory computer-readable medium that stores a set of instructions for providing voice assistance in a virtual or augmented reality environment. The set of instructions, when executed by one or more processors of a device, may cause the device to display a first visualization associated with the virtual or augmented reality environment. The set of instructions, when executed by one or more processors of the device, may cause the device to display a second visualization, subsequent to the first visualization, associated with the virtual or augmented reality environment. The set of instructions, when executed by one or more processors of the device, may cause the device to determine that an indicator of change from the first visualization to the second visualization satisfies a relevance threshold. The set of instructions, when executed by one or more processors of the device, may cause the device to apply a description model, based on the indicator of change satisfying the relevance threshold, to determine at least one sentence describing the virtual or augmented reality environment. The set of instructions, when executed by one or more processors of the device, may cause the device to output, to a user and using an output component, sound based on applying a text-to-speech model to the at least one sentence.

BRIEF DESCRIPTION OF THE DRAWINGS

FIGS. 1A-1H are diagrams of an example implementation relating to voice assistance in virtual reality (VR) environments and augmented reality (AR) environments, in accordance with some embodiments of the present disclosure.

DETAILED DESCRIPTION

The following detailed description of example implementations refers to the accompanying drawings. The same reference numbers in different drawings may identify the same or similar elements.

Virtual reality (VR) environments and augmented reality (AR) environments may be difficult for visually-impaired users to navigate. In particular, visually-impaired users may rely on additional audio cues when navigating through VR and AR environments. A designer of a VR or AR environment may generate alternative text for various portions (whether spatial and/or temporal) of the environment that can be activated for visually-impaired users. However, large amounts of alternative text consume memory (e.g., at a cloud service or another type of server hosting the environment) and network bandwidth (e.g., when transmitted to a VR/AR device of a visually-impaired user). Additionally, all users that activate the alternative text receive a same number of audio cues with a same level of detail, which wastes processing resources and power for some users that need less assistance.

An alternative is to use computer vision to identify items within each frame of the environment and generate audio cues based on the computer vision. However, computer vision consumes a significant amount of processing resources and power (whether at the cloud service or at the VR/AR device of the visually-impaired user). Additionally, generating descriptions for every frame of the environment consumes a significant amount of processing resources and power (whether at the cloud service or at the VR/AR device of the visually-impaired user).

Some implementations described herein enable a model to identify when important scene changes are happening. Accordingly, audio cues may be generated only when important scene changes are happening. As a result, processing resources and power are conserved (whether at the cloud service or at the VR/AR device of the visually-impaired user). In some implementations, a user may indicate a level of voice assistance desired such that a threshold triggering identification of an important scene change is customizable. As a result, processing resources and power are conserved for some users that need less assistance.

FIGS. 1A-1H are diagrams of an example 100 associated with voice assistance in VR environments and AR environments. As shown in FIGS. 1A-1H, example 100 includes a VR/AR device and a cloud service. These devices are described in more detail in connection with FIGS. 4 and 5.

Figure 1A:
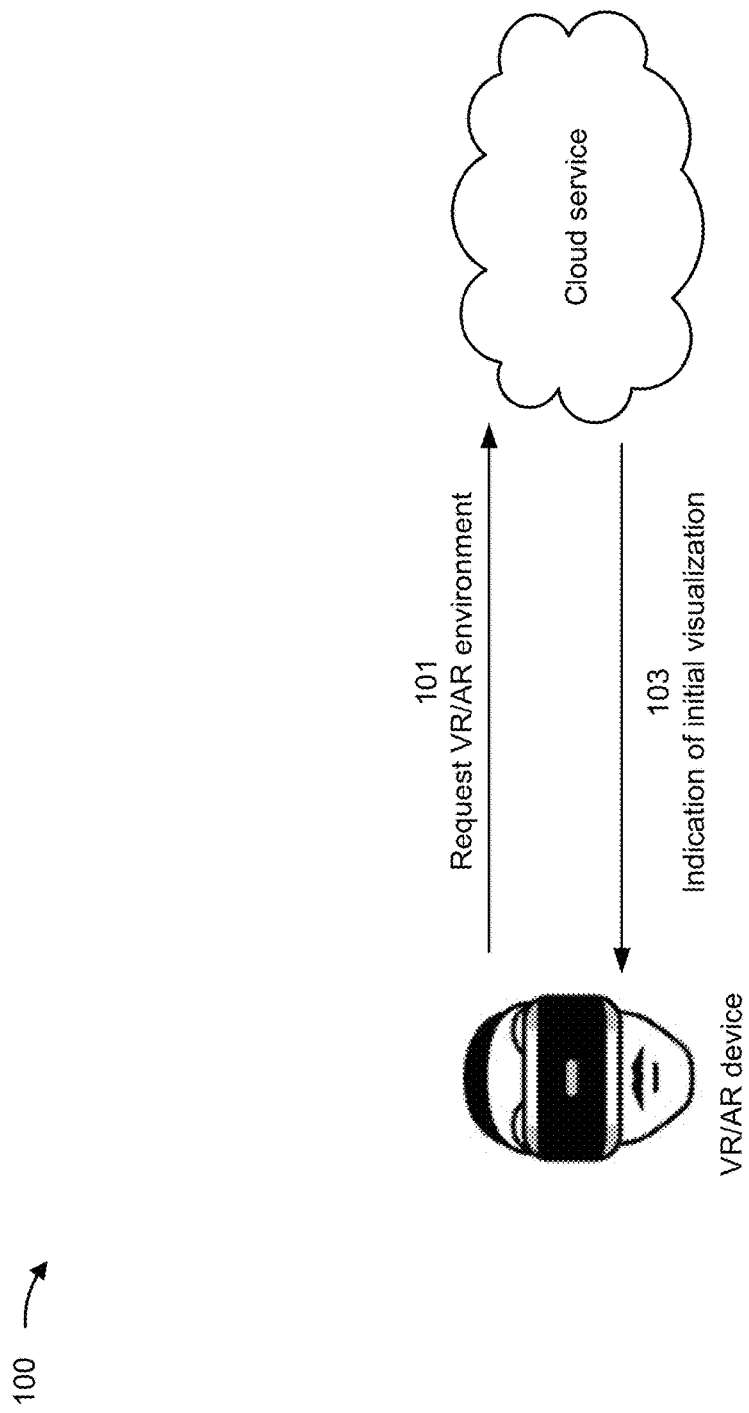

As shown in FIG. 1A and by reference number 101, the VR/AR device may transmit, and the cloud service may receive, a request for a VR/AR environment. For example, the request may be a hypertext transfer protocol (HTTP) request and/or an application programming interface (API) call, among other examples. The request may include an identifier associated with the VR/AR environment. For example, the VR/AR device may receive (e.g., from a local memory associated with the VR/AR device or from the cloud service) the identifier associated with the VR/AR environment using a data structure that maps different VR/AR environments to associated identifiers. Although the example 100 is described in connection with the cloud service, other examples may include another type of remote device (e.g., a remote server) that performs functions described herein as performed by the cloud service.

In one example, a user of the VR/AR device may provide input (e.g., using an input component associated with the VR/AR device) that triggers the VR/AR device to transmit the request. In some implementations, the input comprises interaction with a user interface (UI) generated by software executed by the VR/AR device or a voice command received by the VR/AR device. In another example, the VR/AR device automatically transmits the request (e.g., according to a schedule).

As shown by reference number 103, the cloud service may transmit, and the VR/AR device may receive, an indication of an initial visualization associated with the VR/AR environment. For example, the indication may include data encoding the initial visualization, such as one or more video frames for display (e.g., an intra-coded picture or "I frame," a predicted picture or "P frame," and/or a bidirectional predicted picture or "B frame," among other examples) and/or one or more digital sound signals for playing. In some implementations, the data encoding the initial visualization may further include data indicating a spatial and/or temporal order associated with the video frame(s) and/or the digital sound signal(s).

Figure 1B:
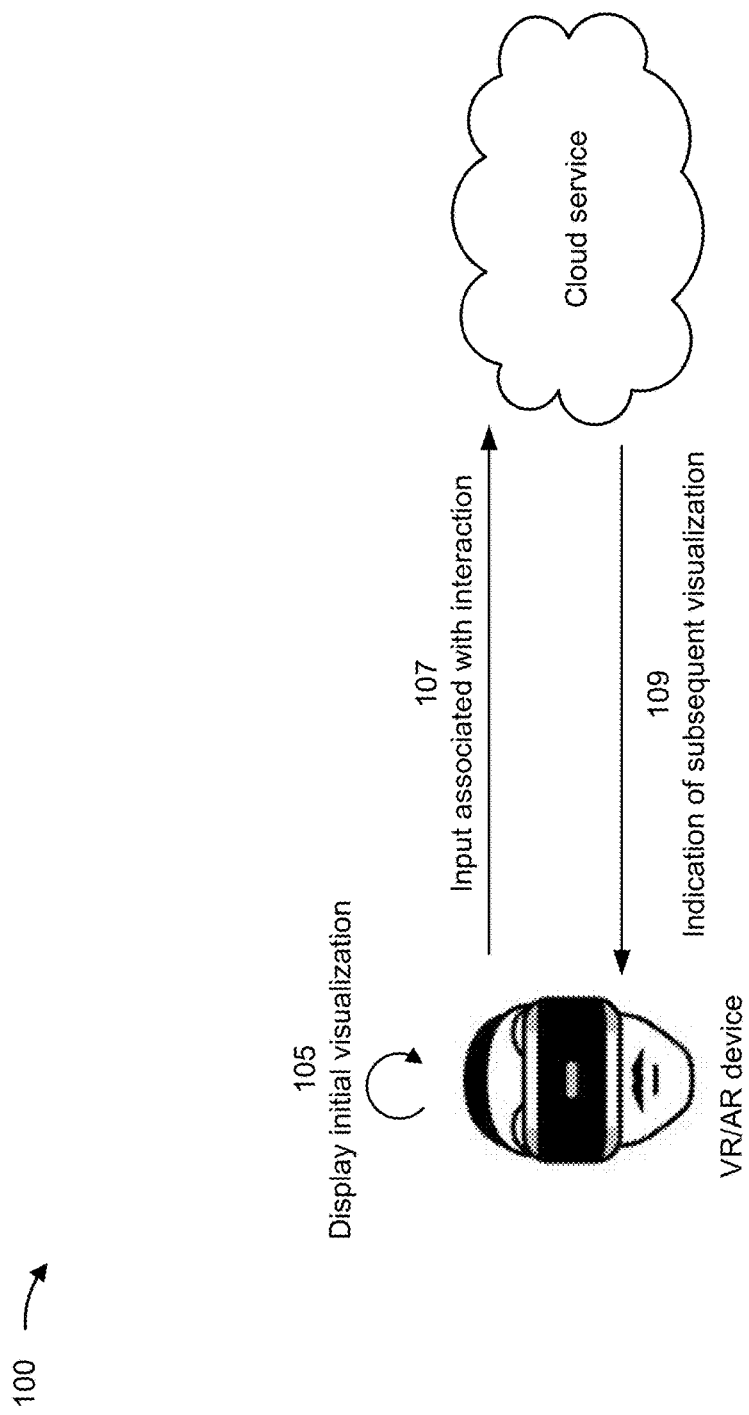

As shown in FIG. 1B and by reference number 105, the VR/AR device may display the initial visualization. For example, the VR/AR device may transmit the data encoding the initial visualization to an output component associated with the VR/AR device (e.g., a display). Accordingly, the output component may show the initial visualization to the user. Additionally, in some implementations, the data encoding the initial visualization may include digital sound signal(s) such that an output component (e.g., a speaker) may play sound(s) based on the digital sound signal(s).

As shown by reference number 107, the VR/AR device may transmit, and the cloud service may receive, input associated with interaction with the VR/AR environment. The input may include an indication of new coordinates (e.g., associated with the VR/AR environment) calculated based on movement of the user (e.g., determined using one or more sensors, such as inertial measurement units (IMUs), associated with the VR/AR device). Additionally, or alternatively, the input may include an indication of how the user moved (e.g., raw output from, or derived calculations based on output from, sensor(s) associated with the VR/AR device). Additionally, or alternatively, the input may include an indication of interaction with an input component (e.g., an input button, a joystick, or a keyboard, among other examples) associated with the VR/AR device.

As shown by reference number 109, the cloud service may transmit, and the VR/AR device may receive, an indication of a subsequent visualization associated with the VR/AR environment. For example, the indication may include data encoding the subsequent visualization, in a similar manner as described above in connection with the initial visualization. The cloud service may determine the subsequent visualization based on the input from the VR/AR device. For example, the cloud service may determine one or more new video frames and/or one or more new digital sound signals based on movement of the user from a previous location to a new location in the VR/AR environment. In another example, the cloud service may determine new video frame(s) and/or new digital sound signal(s) based on interaction with a person or object of the VR/AR environment (e.g., by movement of the user to a distance from the person or object that satisfies a distance threshold and/or by interaction with an input component associated with the VR/AR device, such as pushing a button or entering text with a keyboard).

Although the example 100 is described in connection with the subsequent visualization being based on input associated with interaction with the VR/AR environment, other examples may include the subsequent visualization being based on a trigger. In some implementations, the trigger may be an in-world trigger, such as a particular time and/or date in a world of the VR/AR environment, a weather event in the world of the VR/AR environment, and/or a temporal or physical point associated with a story in the VR/AR environment, among other examples. In some implementations, the trigger may be an external trigger, such as a particular time and/or date in the physical world, a weather event in the physical world, and/or a property (e.g., battery life or temperature, among other examples) associated with the VR/AR device, among other examples.

Figure 1C:
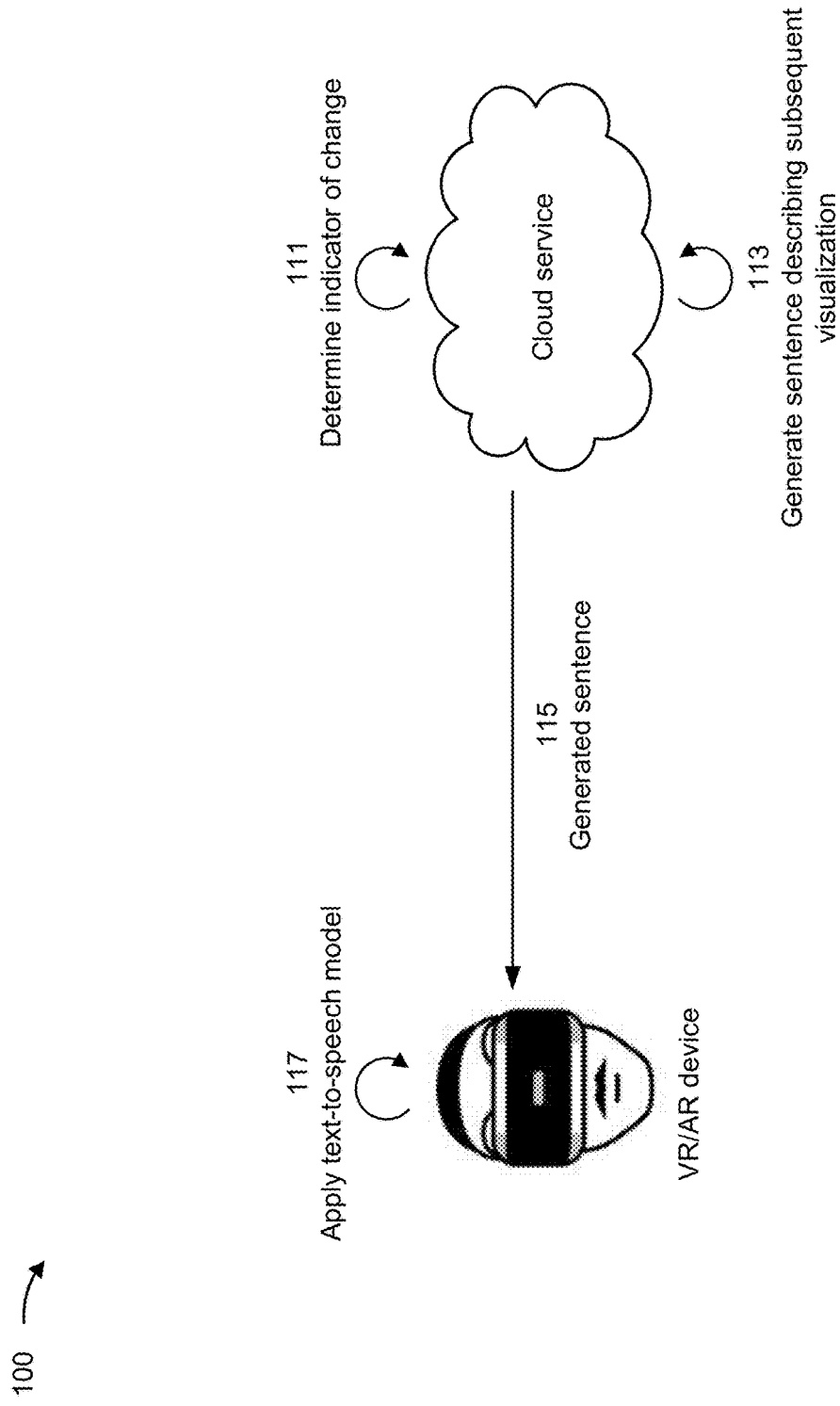

As shown in FIG. 1C and by reference number 111, the cloud service may determine an indicator of change from the initial visualization to the subsequent visualization. In some implementations, the indicator of change may be numerical (e.g., a change value). Alternatively, the indicator of change may be qualitative (e.g., a letter grade or a selected level from a plurality of possible levels, among other examples). In some implementations, the VR/AR device may transmit, and the cloud service may receive, a command to provide voice assistance. Based on the command (e.g., in response to the command), the cloud service may calculate the indicator of change. The command may comprise an HTTP request and/or an API call, among other examples. In one example, a user of the VR/AR device may provide input (e.g., using an input component associated with the VR/AR device) that triggers the VR/AR device to transmit the command. In some implementations, the input comprises interaction with a UI generated by software executed by the VR/AR device or a voice command received by the VR/AR device. In another example, the VR/AR device automatically transmits the command based on a setting associated with the user (e.g., whenever transmitting a request for an environment, as described in connection with reference number 101).

In some implementations, the cloud service may receive an indication of the initial visualization and an indication of the subsequent visualization. For example, the cloud service may receive the indications based on determining the initial visualization and the subsequent visualization (e.g., for transmitting data encoding the initial visualization and data encoding the subsequent visualization to the VR/AR device, as described above). In some implementations, the indications may include file names (e.g., associated with the initial visualization and the subsequent visualization) and/or additional identifiers of the initial visualization and the subsequent visualization. Accordingly, the cloud service may determine the indicator of change based on the indication of the initial visualization and the indication of the subsequent visualization.

In one example, the cloud service may calculate the indicator of change as a measurement based on pixel changes from the initial visualization to the subsequent visualization. For example, the cloud service may calculate a per-pixel value that encodes a difference between hexadecimal codes, red-blue-green numbers, and/or values from another image encoding scheme. In some implementations, the indicator of change may be an average over multiple frames (e.g., including the initial visualization, the subsequent visualization, and one or more intermediate visualizations between the initial visualization and the subsequent visualization) within a time window. The time window may be a default time window (e.g., stored on a memory associated with the cloud service) or a custom time window (e.g., indicated by the VR/AR device or an administrator of the cloud service).

Additionally, or alternatively, the cloud service may apply a motion model to the initial visualization and the subsequent visualization to generate the indicator of change. For example, the cloud service may apply a block-matching algorithm, a phase correlation method, a frequency domain method, a pixel recursive algorithm, an optical flow technique, and/or corner detection, among other examples, to estimate motion of an object from the initial visualization and the subsequent visualization. In some implementations, the cloud service may perform object identification before applying the motion model. Accordingly, the indicator of change may be calculated based on how many objects have moved, based on an estimate of a speed of a moving object, and/or based on an estimate of a distance traversed by the moving object. In a combinatory example, the cloud service may sum, average, multiply, or otherwise mathematically combine a measurement based on pixel changes with output from the motion model in order to calculate the indicator of change.

Additionally, or alternatively, the cloud service may apply an image model to the initial visualization to generate first string descriptors (e.g., one or more first string descriptors) and to the subsequent visualization to generate second string descriptors (e.g., one or more second string descriptors). The image model may include a Viola-Jones object detection framework (e.g., based on Haar features), a scale-invariant feature transform (SIFT) model, or a histogram of oriented gradients (HOG) model, among other examples. In another example, the image model may include a neural network, such as a convolutional neural network (CNN) like a region-based CNN (R-CNN), a single shot multibox detector (SSD), or a "you only look once" (YOLO) model, among other examples. Accordingly, the image model may identify objects (e.g., one or more objects) in the visualizations. Additionally, in some implementations, the image model may determine a set of bounding boxes corresponding to the objects. For example, each object may be identified within a data structure (e.g., a class object and/or another type of data structure) storing coordinates of a bounding box that encloses pixels classified as part of the object. Additionally, the data structure may include a classification for the object. The image model may therefore generate a string descriptor (e.g., at least one string descriptor) for each object (e.g., by selecting from a database of string descriptors). The image model may thus include, at least in part, a natural language processing (NLP) model.

Although the image model in the example 100 is described as a single model, other examples may include a plurality of models. For example, the image model may include an object recognition model to identify objects in the visualizations and an object descriptor model to generate a string descriptor (e.g., at least one string descriptor) for each object. Accordingly, the cloud service may use output from the object recognition model (e.g., a data structure storing coordinates of a bounding box that encloses pixels classified as part of an object and/or a classification for the object) as input to the object descriptor model.

Accordingly, the indicator of change may be calculated based on the first string descriptors and the second string descriptors. For example, the cloud service may calculate a distance between characters of the first string descriptors and characters of the second string descriptors. In some implementations, the cloud service may normalize the indicator of change to account for any objects identified in the subsequent visualization and not in the initial visualization and/or for any objects identified in the initial visualization and not in the subsequent visualization. In a combinatory example, the cloud service may sum, average, multiply, or otherwise mathematically combine a measurement based on pixel changes and/or output from the motion model with output from the image model in order to calculate the indicator of change.

Additionally, or alternatively, the cloud service may determine whether the subsequent visualization is associated with an I frame. For example, the cloud service may increase the indicator of change based on the subsequent visualization being associated with an I frame. Similarly, the cloud service may decrease the indicator of change based on the subsequent visualization being associated (only) with a P frame and/or a B frame. Alternatively, the cloud service may override the indicator of change based on the subsequent visualization being associated with an I frame.

Additionally, or alternatively, the cloud service may receive a location (e.g., indicated using in-world coordinates for the VR/AR environment) associated with the subsequent visualization. For example, the cloud service may receive the location, from a memory associated with the cloud service, based on a data structure that associates visualizations (e.g., the subsequent visualization) with locations. In another example, the cloud service may receive the location as previously determined based on crowdsourced information from previous users associated with the VR/AR environment. The crowdsourced information may indicate historical interactions of the previous users with the VR/AR environment and/or feedback from the previous users, and the cloud service may determine the location based on a sufficient quantity of historical users (e.g., satisfying a crowdsourcing threshold) performing an interaction at the location and/or indicating the location in feedback. Therefore, the location may be used to increase (or decrease) the indicator of change. Alternatively, the cloud service may override the indicator of change based on the location being indicated.

Additionally, or alternatively, the cloud service may receive a tag associated with the subsequent visualization that includes the indicator of change. For example, the cloud service may receive the tag, from a memory associated with the cloud service, as previously stored based on input from an administrator of the cloud service. In another example, the cloud service may receive the tag as previously generated based on crowdsourced information from previous users associated with the VR/AR environment. The crowdsourced information may indicate historical interactions of the previous users with the VR/AR environment and/or feedback from the previous users, and the cloud service may generate the tag based on a sufficient quantity of historical users (e.g., satisfying a crowdsourcing threshold) performing an interaction during the subsequent visualization and/or indicating the subsequent visualization in feedback. The tag may indicate that the subsequent visualization is particularly important (or unimportant). Therefore, the tag may be used to increase (or decrease) the indicator of change. Alternatively, the cloud service may override the indicator of change based on the tag being received.

Any of the calculations described above in connection with the indicator of change may be performed by a change model. A change model is a formula, a neural network, or another type of algorithm that calculates an indicator of change from two or more visualizations. The change model may expressly combine calculations (e.g., using arithmetic) and/or may implicitly combine calculations (e.g., by generating the indicator of change based on a combination of features).

The cloud service may additionally determine that the indicator of change satisfies a relevance threshold (or that presence of an I frame, the tag, and/or the location overrides the indicator of change and satisfies the relevance threshold). The relevance threshold may be a default value (e.g., stored on a memory associated with the cloud service) or a custom value. For example, the VR/AR device may transmit, and the cloud service may receive, an indication of a setting associated with a level of voice assistance. The indication may be included in an HTTP message and/or as an argument to an API call, among other examples. In one example, a user of the VR/AR device may provide input (e.g., using an input component associated with the VR/AR device) that triggers the VR/AR device to transmit the indication. In some implementations, the input comprises interaction with a UI generated by software executed by the VR/AR device or a voice command received by the VR/AR device. In another example, the VR/AR device automatically transmits the indication based on a setting associated with the user (e.g., whenever transmitting a request for an environment, as described in connection with reference number 101).

Therefore, the cloud service may determine the relevance threshold based on the setting. For example, the cloud service may use a formula that accepts the setting as input and that outputs a corresponding relevance threshold. In some implementations, the cloud service may select the relevance threshold, from a plurality of possible relevance thresholds, based on the setting. For example, the cloud service may use a data structure (e.g., a look-up table) that maps different settings to different relevance thresholds.

By triggering audio assistance only when the relevance threshold is satisfied, the cloud service conserves processing resources and power that would otherwise have been consumed in providing audio assistance during additional visualizations. In some implementations, because the user indicates a setting that adjusts the relevance threshold, the cloud service conserves processing resources and power that would otherwise have been consumed in providing additional audio assistance from which the user is unlikely to benefit.

Based on the indicator of change satisfying the relevance threshold, the cloud service may apply the image model (e.g., as described above) to determine string descriptors (e.g., one or more string descriptors) for the subsequent visualization. Alternatively, when the cloud service has already applied the image model to the subsequent visualization (e.g., as described above), the cloud service may receive (e.g., from a cache associated with the cloud service) the string descriptors. Furthermore, as shown by reference number 113, the cloud service may apply a language model to generate a sentence (e.g., at least one sentence) that describes the subsequent visualization. The language model may include an NLP model that uses connecting phrases (e.g., a plurality of connecting phrases) to join the string descriptors from the image model into a narrative. In some implementations, the language model may pseudo-randomly select the connecting phrases in order to provide variety to the user. Additionally, or alternatively, the language model may have a database of ranked (or otherwise ordered) connecting phrases and select the connecting phrases according to the order (e.g., in order to mimic natural language flow). In a combinatory example, the language model may pseudo-randomly select from starting connecting phrases (e.g., a plurality of starting connecting phrases) and then follow an order of additional connecting phrases associated with the selected starting connecting phrase. Additionally, or alternatively, the language model may include an NLP model that uses abstractive-based summarization to generate new, human-readable text, that incorporates the string descriptors.

Although the image model and the language model in the example 100 are described as two models, other examples may include a single model. For example, a description model may include both the image model to identify and describe objects in a visualization and the language model to generate a sentence describing the visualization.

As shown by reference number 115, the cloud service may transmit, and the VR/AR device may receive, the sentence generated by the language model. By transmitting the sentence for conversion to a digital sound signal at the VR/AR device, the cloud service conserves network bandwidth that would otherwise have been consumed in transmitting the digital sound signal.

As shown by reference number 117, the VR/AR device may apply a text-to-speech model to the sentence to generate a digital sound signal. The text-to-speech model may be included in a dynamic-link library (DLL), a Java® library, or another type of shared library (or shared object). Accordingly, the text-to-speech model may comprise executable code that converts text into digital sound signals. The text-to-speech model may be at least partially integrated with software executed by the VR/AR device. Alternatively, the text-to-speech model may be at least partially integrated with an operating system (OS) of the VR/AR device, such that the software uses an API call or another type of request to the OS to use the text-to-speech model.

Figure 2A:
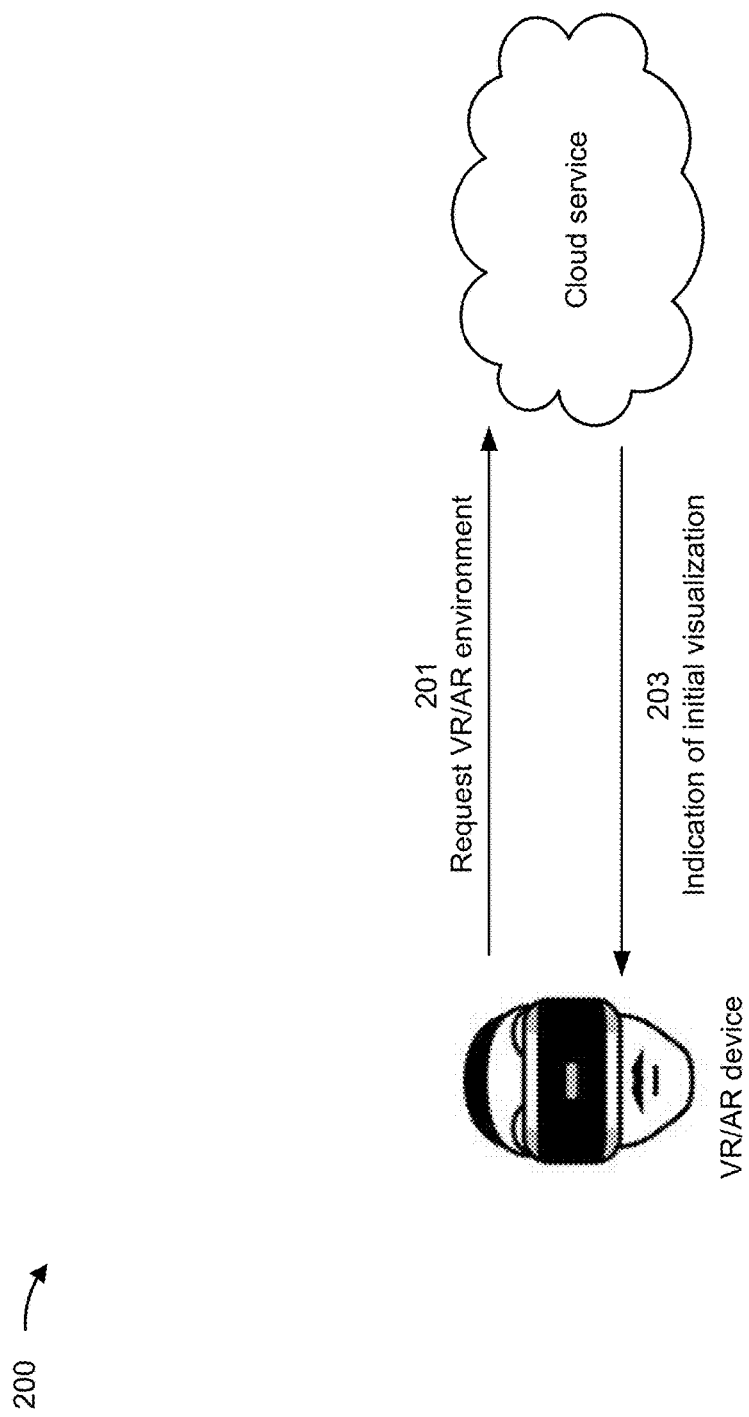
FIGS. 2A-2H are diagrams of an example implementation relating to voice assistance in VR environments and AR environments, in accordance with some embodiments of the present disclosure.
Figure 2B:
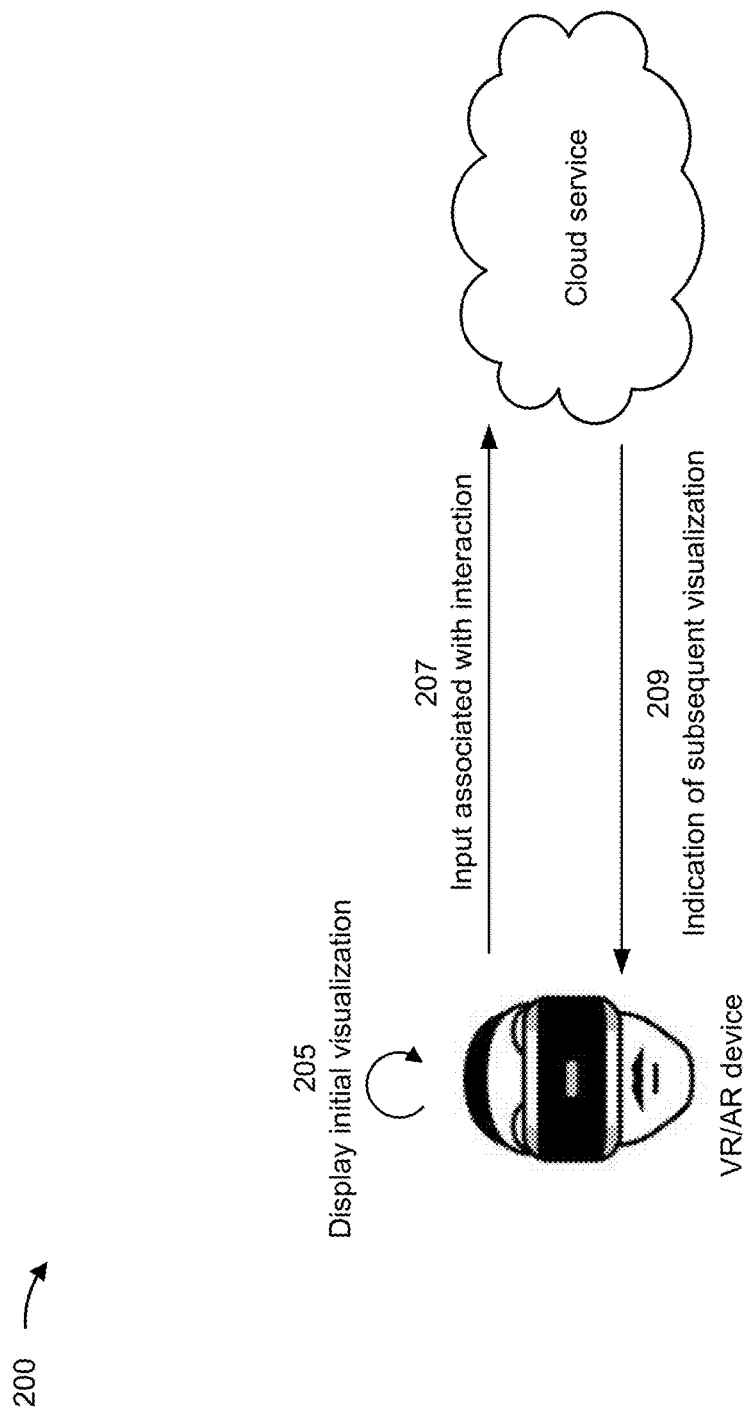
Figure 2C:
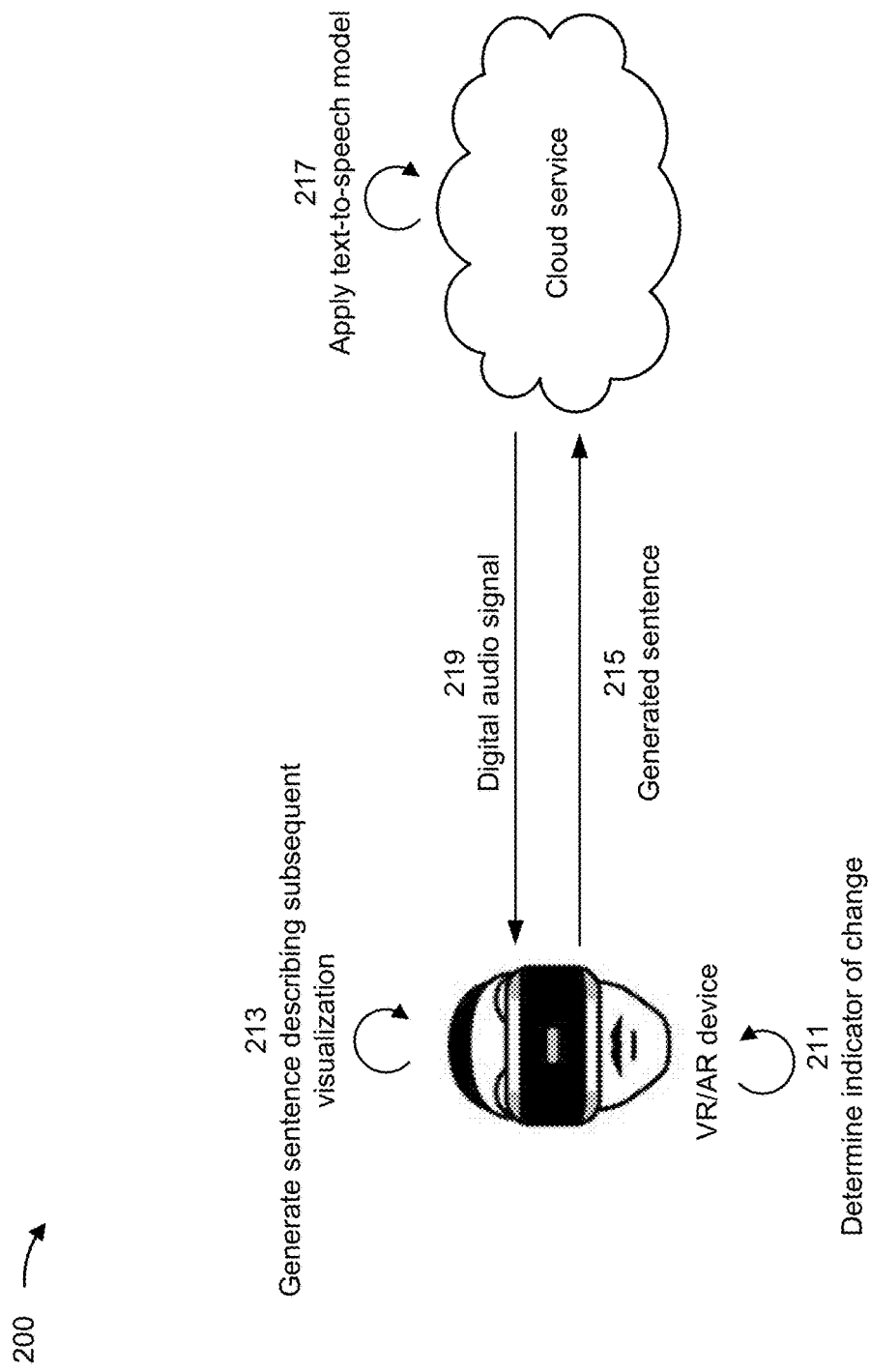
Figure 2D:
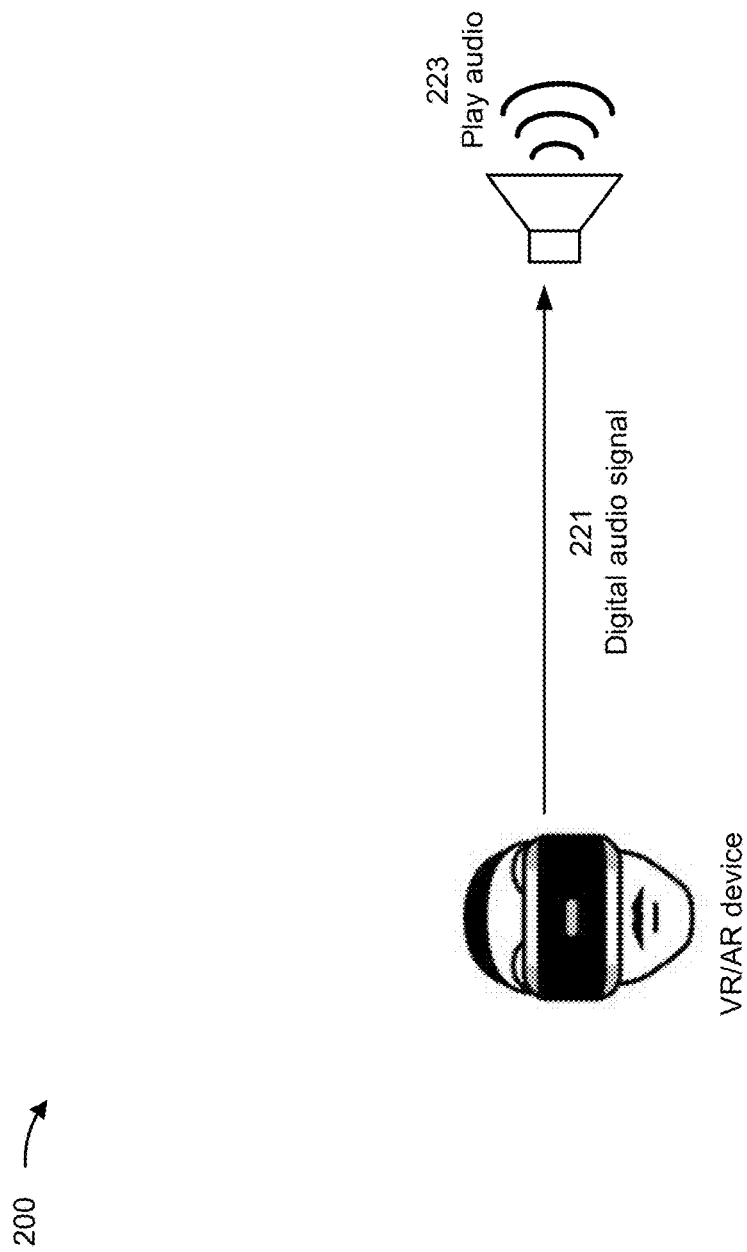
Figure 2E:
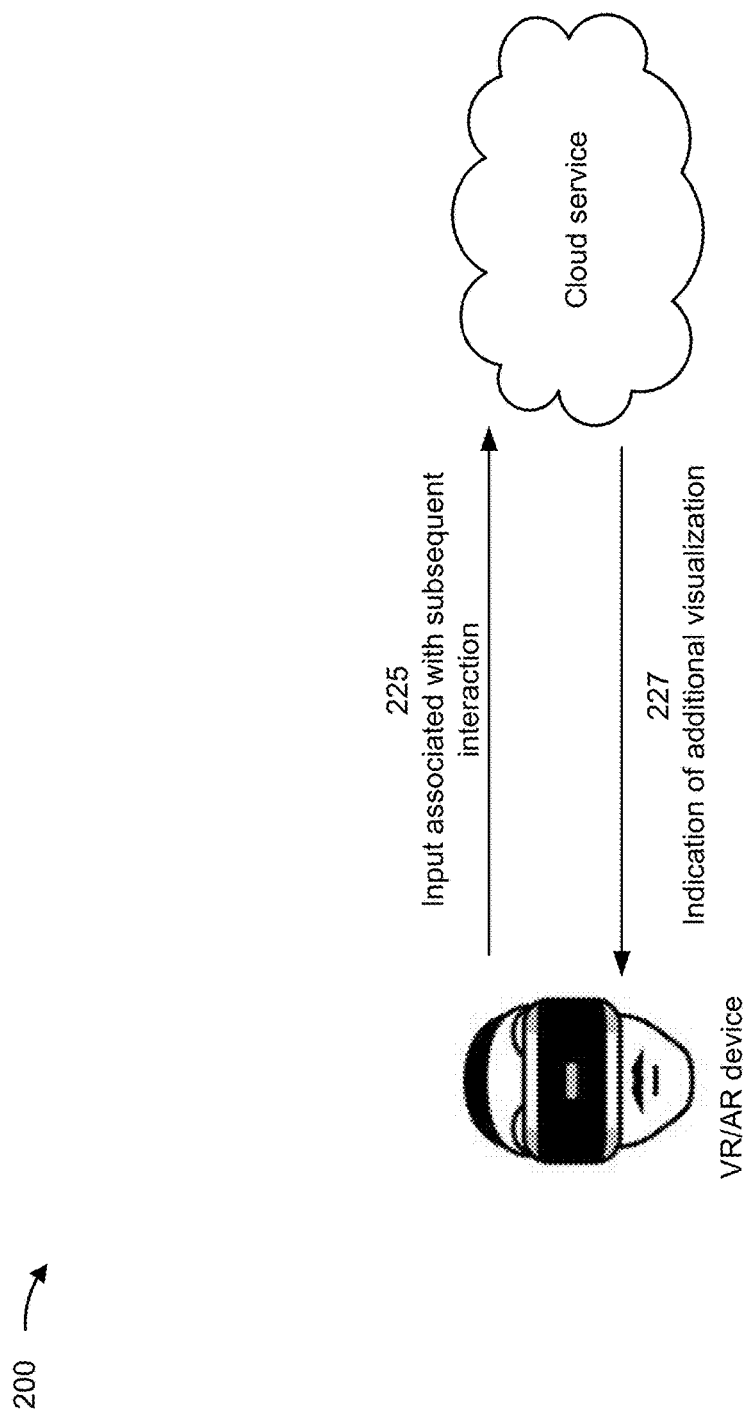
Figure 2F:
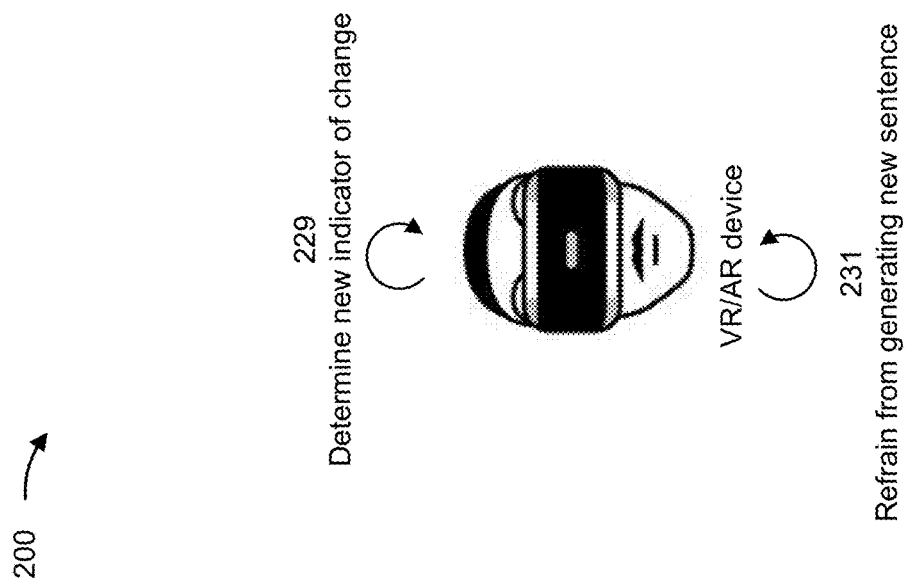
Figure 2G:
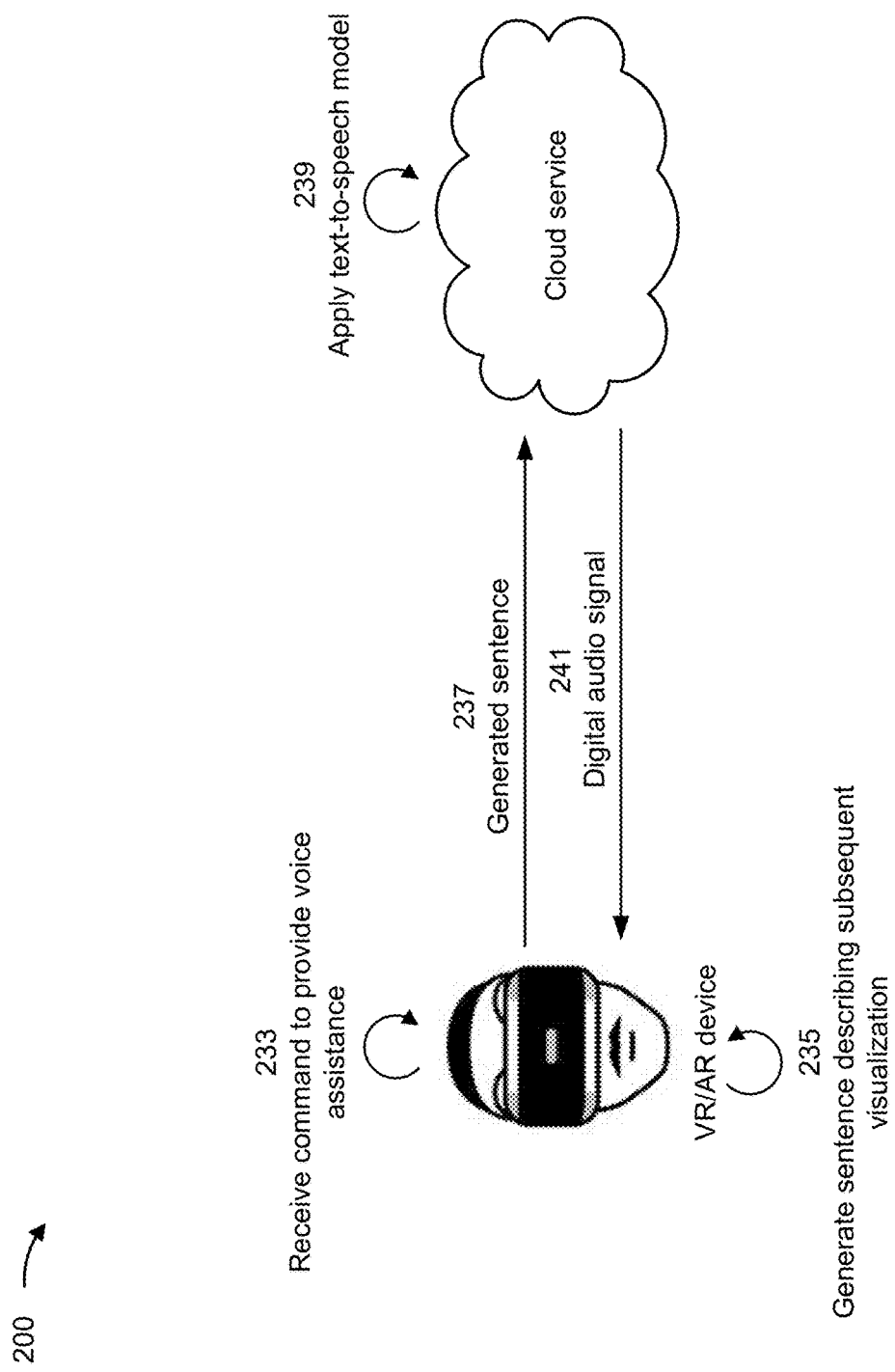

Although the example 100 is shown with the VR/AR device applying the text-to-speech model, other examples may include the cloud service applying the text-to-speech model (e.g., as shown in FIGS. 2C and 2G). By applying the text-to-speech model at the cloud service, the cloud service conserves processing resources and power that would otherwise have been consumed at the VR/AR device in applying the text-to-speech model.

As shown in FIG. 1D and by reference number 119, the VR/AR device may transmit, and an output component associated with the VR/AR device (e.g., a speaker) may receive, the digital sound signal generated by the text-to-speech model. Accordingly, as shown by reference number 121, the output component may play sound based on the digital sound signal. The sound thus provides audio assistance to the user of the VR/AR device.

In some implementations, the VR/AR device may transmit, and the cloud service may receive, feedback associated with the sound. For example, a user of the VR/AR device may provide input (e.g., using an input component associated with the VR/AR device) that rates or otherwise indicates whether the sound was helpful. Additionally, or alternatively, the user may provide input that suggests a change to the sound. Accordingly, the cloud service may update any of the models applied based on the feedback. For example, the cloud service may perform one or more re-training cycles based on a new test data point generated using the feedback (e.g., a new test point encoding a suggested change to the sound).

Figure 1E:
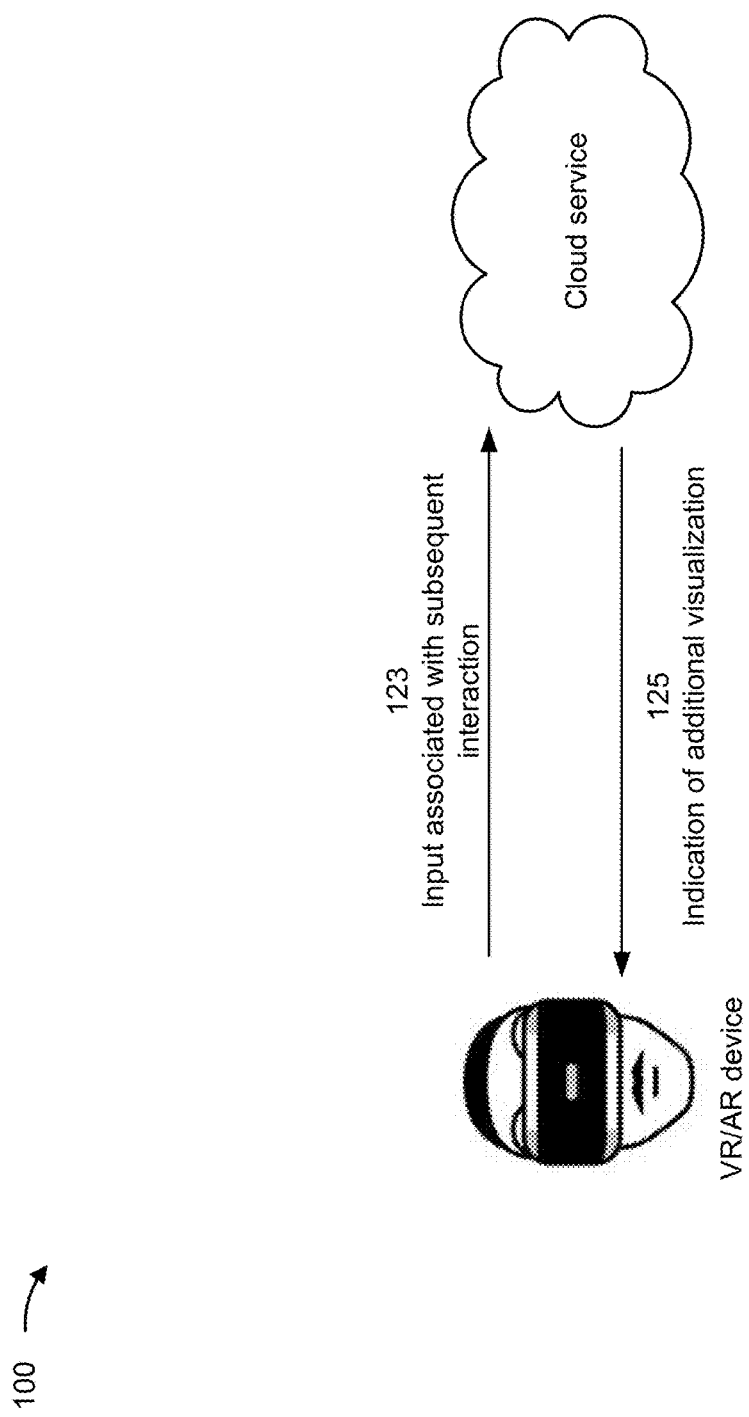

In some implementations, as shown in FIG. 1E and by reference number 123, the VR/AR device may transmit, and the cloud service may receive, input associated with a subsequent interaction with the VR/AR environment. As described in connection with reference number 107, the input may include an indication of new coordinates (e.g., associated with the VR/AR environment) calculated based on movement of the user (e.g., determined using sensor(s) associated with the VR/AR device) and/or an indication of how the user moved (e.g., raw output from, or derived calculations based on output from, sensor(s) associated with the VR/AR device). Additionally, or alternatively, the input may include an indication of interaction with an input component (e.g., an input button, a joystick, or a keyboard, among other examples) associated with the VR/AR device.

As shown by reference number 125, the cloud service may transmit, and the VR/AR device may receive, an indication of an additional visualization associated with the VR/AR environment. For example, the indication may include data encoding the additional visualization, in a similar manner as described above in connection with the initial visualization. As described in connection with reference number 109, the cloud service may determine the additional visualization based on the input from the VR/AR device. Although the example 100 is described in connection with the additional visualization being based on input associated with interaction with the VR/AR environment, other examples may include the additional visualization being based on a trigger, as described above.

Figure 1F:
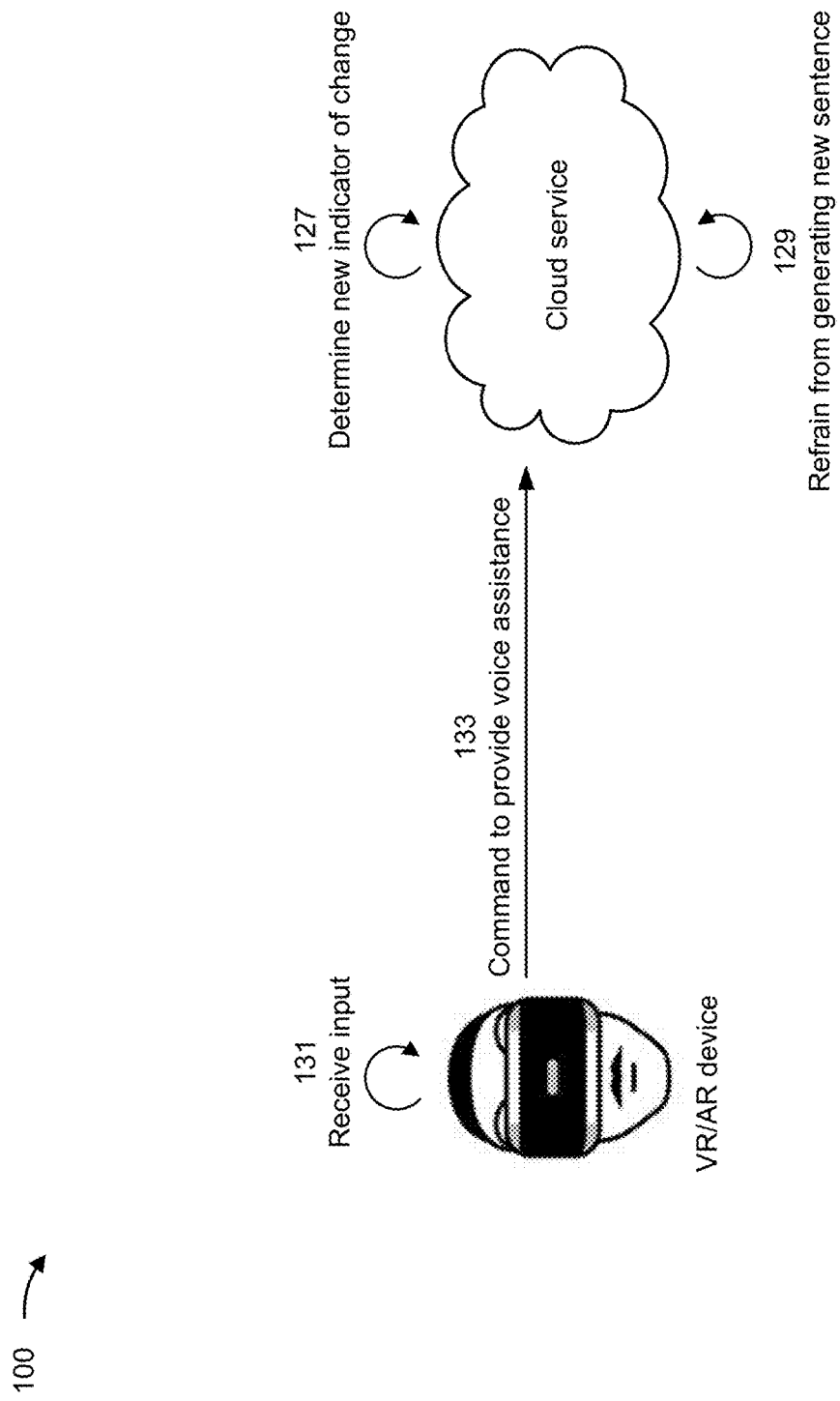

As shown in FIG. 1F and by reference number 127, the cloud service may determine a new indicator of change from the subsequent visualization to the additional visualization. The cloud service may calculate the new indicator of change in a similar manner as described in connection with reference number 111.

The cloud service may additionally determine that the new indicator of change fails to satisfy the relevance threshold (or that presence of an I frame, a tag associated with the additional visualization, and/or a location associated with the additional visualization overrides the new indicator of change and fails to satisfy the relevance threshold). Based on the new indicator of change failing to satisfy the relevance threshold, the cloud service may refrain from generating a sentence (e.g., at least one sentence) that describes the additional visualization, as shown by reference number 129. Therefore, the cloud service may conserve power and processing resources by refraining from executing the image model and the language model. Even in implementations where the cloud service uses the image model to determine the new indicator of change, the cloud service still conserves power and processing resources that would otherwise have been consumed by the language model (which may consume more power and processing resources than the image model).

In some implementations, as shown by reference number 131, the VR/AR device may input triggering a command to provide voice assistance. In some implementations, the input comprises interaction with a UI (e.g., received using an input button, a joystick, or a keyboard, among other examples) generated by software executed by the VR/AR device or a voice command received by the VR/AR device (e.g., using a microphone) associated with the VR/AR device. Accordingly, as shown by reference number 133, the VR/AR device may transmit, and the cloud service may receive, the command to provide voice assistance. The command may comprise an HTTP request and/or an API call, among other examples.

Figure 1G:
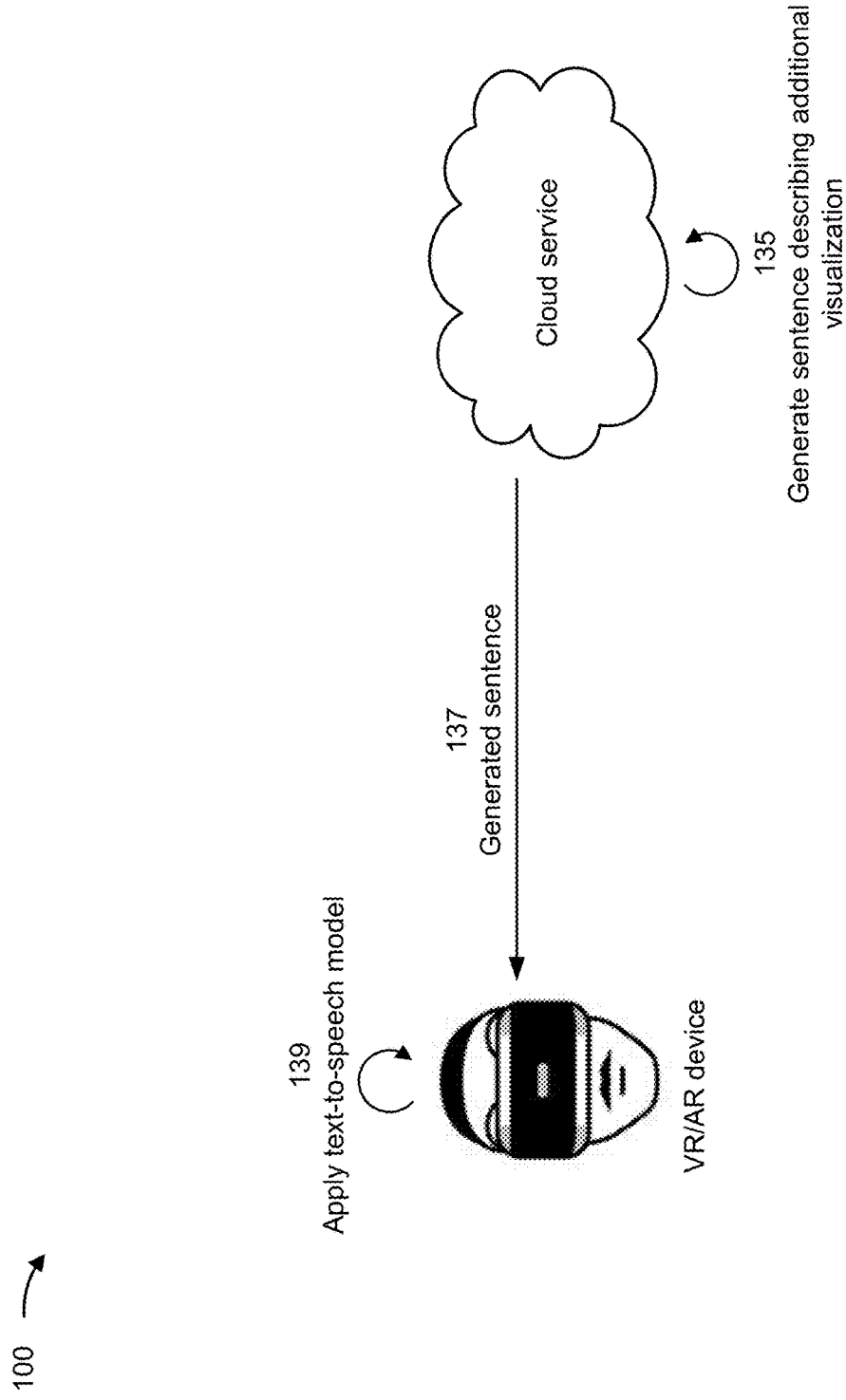

Based on the command (e.g., in response to the command), the cloud service may apply the image model (e.g., as described above) to determine additional string descriptors (e.g., one or more additional string descriptors) for the additional visualization. Alternatively, when the cloud service has already applied the image model to the additional visualization (e.g., to calculate the new indicator of change), the cloud service may receive (e.g., from a cache associated with the cloud service) the additional string descriptors. Furthermore, as shown in FIG. 1G and by reference number 135, the cloud service may apply the language model to generate an additional sentence (e.g., at least one additional sentence) that describes the additional visualization.

As shown by reference number 137, the cloud service may transmit, and the VR/AR device may receive, the additional sentence generated by the language model. As shown by reference number 139, the VR/AR device may apply the text-to-speech model to the additional sentence to generate an additional digital sound signal. Although the example 100 is shown with the VR/AR device applying the text-to-speech model, other examples may include the cloud service applying the text-to-speech model (e.g., as shown in FIGS. 2C and 2G).

Figure 1H:
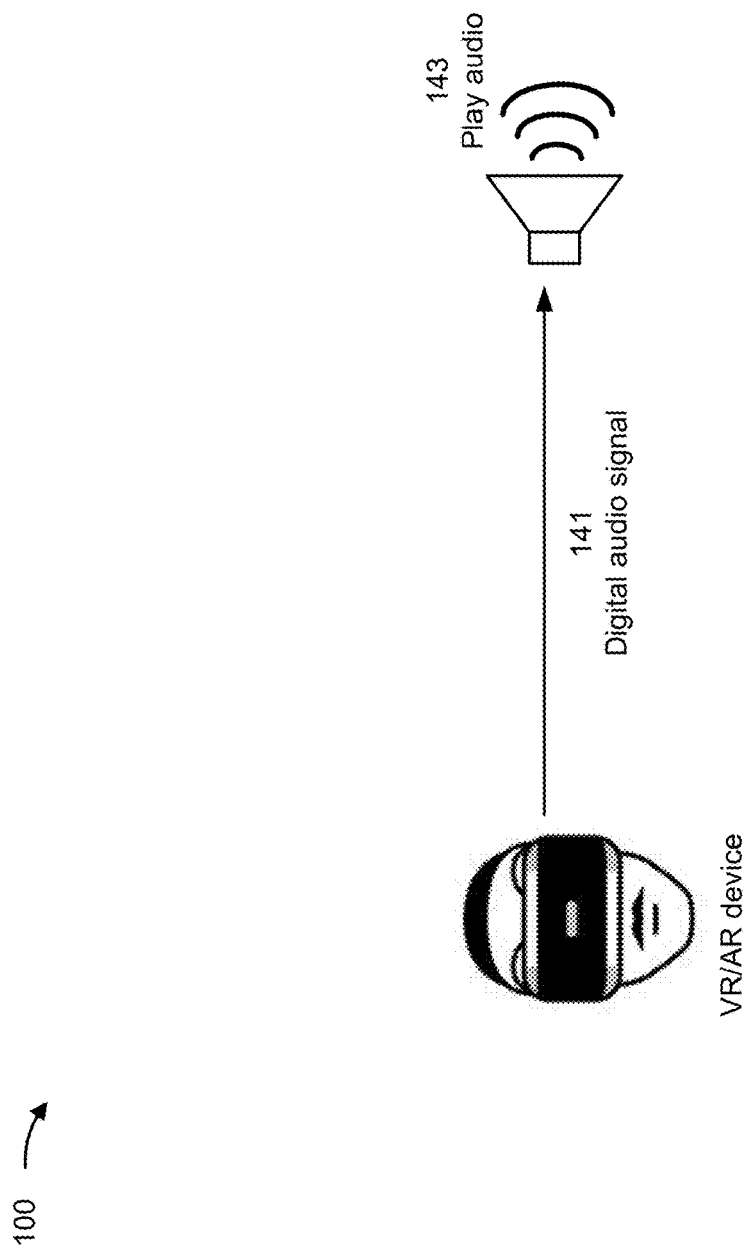

As shown in FIG. 1H and by reference number 141, the VR/AR device may transmit, and an output component associated with the VR/AR device (e.g., a speaker) may receive, the additional digital sound signal generated by the text-to-speech model. Accordingly, as shown by reference number 143, the output component may play additional sound based on the additional digital sound signal. The additional sound thus provides audio assistance to the user of the VR/AR device.

By using techniques as described in connection with FIGS. 1A-1H, the cloud service conserves memory overhead by using the image model and the language model in lieu of vast quantities of alternative text. Additionally, in some implementations, the relevance threshold is customizable such that the cloud service conserves processing resources and power that would otherwise have been expended by providing undesired audio assistance.

As indicated above, FIGS. 1A-1H are provided as an example. Other examples may differ from what is described with regard to FIGS. 1A-1H.

FIGS. 2A-2H are diagrams of an example 200 associated with voice assistance in VR environments and AR environments. As shown in FIGS. 2A-2H, example 200 includes a VR/AR device and a cloud service. These devices are described in more detail in connection with FIGS. 4 and 5.

As shown in FIG. 2A and by reference number 201, the VR/AR device may transmit, and the cloud service may receive, a request for a VR/AR environment. For example, the VR/AR device may transmit the request as described in connection with reference number 101 of FIG. 1A. As shown by reference number 203, the cloud service may transmit, and the VR/AR device may receive, an indication of an initial visualization associated with the VR/AR environment. For example, the cloud service may transmit the indication as described in connection with reference number 103 of FIG. 1A.

As shown in FIG. 2B and by reference number 205, the VR/AR device may display the initial visualization. For example, the VR/AR device may display the initial visualization as described in connection with reference number 105 of FIG. 1B. As shown by reference number 207, the VR/AR device may transmit, and the cloud service may receive, input associated with interaction with the VR/AR environment. For example, the VR/AR device may transmit the input as described in connection with reference number 107 of FIG. 1B. As shown by reference number 209, the cloud service may transmit, and the VR/AR device may receive, an indication of a subsequent visualization associated with the VR/AR environment. For example, the cloud service may transmit the indication as described in connection with reference number 109 of FIG. 1B.

As shown in FIG. 2C and by reference number 211, the VR/AR device may determine an indicator of change from the initial visualization to the subsequent visualization. In some implementations, the indicator of change may be numerical (e.g., a change value). Alternatively, the indicator of change may be qualitative (e.g., a letter grade or a selected level from a plurality of possible levels, among other examples). The VR/AR device may calculate the indicator of change in a similar manner as described in connection with reference number 111 of FIG. 1C.

In some implementations, the VR/AR device may receive a command to provide voice assistance. Based on the command (e.g., in response to the command), the VR/AR may calculate the indicator of change. In one example, a user of the VR/AR device may provide input (e.g., using an input component associated with the VR/AR device) that triggers the command. In some implementations, the input comprises interaction with a UI generated by software executed by the VR/AR device or a voice command received by the VR/AR device. In another example, the command is automatically triggered based on a setting associated with the user (e.g., whenever displaying a VR/AR environment, as described in connection with reference number 205).

The VR/AR device may additionally determine that the indicator of change satisfies a relevance threshold (or that presence of an I frame, a tag associated with the subsequent visualization, and/or a location associated with the subsequent visualization overrides the indicator of change and satisfies the relevance threshold). The relevance threshold may be a default value (e.g., stored on a memory associated with the VR/AR device) or a custom value. For example, the VR/AR device may receive an indication of a setting associated with a level of voice assistance. In one example, a user of the VR/AR device may provide input (e.g., using an input component associated with the VR/AR device) that triggers the indication. In some implementations, the input comprises interaction with a UI generated by software executed by the VR/AR device or a voice command received by the VR/AR device. In another example, the indication is automatically triggered based on a setting associated with the user (e.g., whenever displaying a VR/AR environment, as described in connection with reference number 205).

Therefore, the VR/AR device may determine the relevance threshold based on the setting. For example, the VR/AR device may determine the relevance threshold in a similar manner as described in connection with FIG. 1C. By triggering audio assistance only when the relevance threshold is satisfied, the VR/AR device conserves processing resources and power that would otherwise have been consumed in providing audio assistance during additional visualizations. In some implementations, because the user indicates a setting that adjusts the relevance threshold, the VR/AR device conserves processing resources and power that would otherwise have been consumed in providing additional audio assistance from which the user is unlikely to benefit.

Based on the indicator of change satisfying the relevance threshold, the VR/AR device may apply an image model (e.g., as described in connection with FIG. 1C) to determine string descriptors (e.g., one or more string descriptors) for the subsequent visualization. Alternatively, when the VR/AR device has already applied the image model to the subsequent visualization (e.g., to calculate the indicator of change), the VR/AR device may receive (e.g., from a cache associated with the VR/AR device) the string descriptors. Furthermore, as shown by reference number 213, the VR/AR device may apply a language model to generate a sentence (e.g., at least one sentence) that describes the subsequent visualization. The language model may be as described in connection with reference number 113 of FIG. 1C.

Although the image model and the language model in the example 200 are described as two models, other examples may include a single model. For example, a description model may include both the image model to identify and describe objects in a visualization and the language model to generate a sentence describing the visualization.

As shown by reference number 215, the VR/AR device may transmit, and the cloud service may receive, the sentence generated by the language model. For example, the sentence may be included in an HTTP request and/or as an argument to an API call. As shown by reference number 217, the cloud service may apply a text-to-speech model to the sentence to generate a digital sound signal. The text-to-speech model may be included in a DLL, a Java library, or another type of shared library (or shared object). Accordingly, the text-to-speech model may comprise executable code that converts text into digital sound signals. The text-to-speech model may be at least partially integrated with software executed by the cloud service. Alternatively, the text-to-speech model may be at least partially integrated with an OS of the cloud service, such that the software uses an API call or another type of request to the OS to use the text-to-speech model.

As shown by reference number 219, the cloud service may transmit, and the VR/AR device may receive, the digital audio signal generated by the text-to-speech model. By transmitting the sentence for conversion to a digital sound signal at the cloud service, the VR/AR device conserves processing resources and power that would otherwise have been consumed in applying the text-to-speech model at the VR/AR device.

Although the example 200 is shown with the cloud service applying the text-to-speech model, other examples may include the VR/AR device applying the text-to-speech model (e.g., as shown in FIGS. 1C and 1G). By applying the text-to-speech model at the VR/AR device, the VR/AR device conserves network overhead that would otherwise have been consumed in transmitting the digital sound signal.

As shown in FIG. 2D and by reference number 221, the VR/AR device may transmit, and an output component associated with the VR/AR device (e.g., a speaker) may receive, the digital sound signal generated by the text-to-speech model. Accordingly, as shown by reference number 223, the output component may play sound based on the digital sound signal. The sound thus provides audio assistance to the user of the VR/AR device.

In some implementations, the VR/AR device may receive feedback associated with the sound. For example, a user of the VR/AR device may provide input (e.g., using an input component associated with the VR/AR device) that rates or otherwise indicates whether the sound was helpful. Additionally, or alternatively, the user may provide input that suggests a change to the sound. Accordingly, the VR/AR device may update any of the models applied based on the feedback. For example, the VR/AR device may perform one or more re-training cycles based on a new test data point generated using the feedback (e.g., a new test point encoding a suggested change to the sound).

In some implementations, as shown in FIG. 2E and by reference number 225, the VR/AR device may transmit, and the cloud service may receive, input associated with a subsequent interaction with the VR/AR environment. As described in connection with reference number 107 of FIG. 1B, the input may include an indication of new coordinates (e.g., associated with the VR/AR environment) calculated based on movement of the user (e.g., determined using sensor(s) associated with the VR/AR device) and/or an indication of how the user moved (e.g., raw output from, derived calculations based on output from, sensor(s) associated with the VR/AR device). Additionally, or alternatively, the input may include an indication of interaction with an input component (e.g., an input button, a joystick, or a keyboard, among other examples) associated with the VR/AR device.

As shown by reference number 227, the cloud service may transmit, and the VR/AR device may receive, an indication of an additional visualization associated with the VR/AR environment. For example, the indication may include data encoding the additional visualization, in a similar manner as described above in connection with the initial visualization. As described in connection with reference number 109 of FIG. 1B, the cloud service may determine the additional visualization based on the input from the VR/AR device. Although the example 200 is described in connection with the additional visualization being based on input associated with interaction with the VR/AR environment, other examples may include the additional visualization being based on a trigger, as described in connection with FIG. 1B.

As shown in FIG. 2F and by reference number 229, the VR/AR device may determine a new indicator of change from the subsequent visualization to the additional visualization. The VR/AR device may calculate the new indicator of change in a similar manner as described in connection with reference number 211.

The VR/AR device may additionally determine that the new indicator of change fails to satisfy the relevance threshold (or that presence of an I frame, a tag associated with the additional visualization, and/or a location associated with the additional visualization overrides the new indicator of change and fails to satisfy the relevance threshold). Based on the new indicator of change failing to satisfy the relevance threshold, the VR/AR device may refrain from generating a sentence (e.g., at least one sentence) that describes the additional visualization, as shown by reference number 231. Therefore, the VR/AR device may conserve power and processing resources by refraining from executing the image model and the language model. Even in implementations where the VR/AR device uses the image model to determine the new indicator of change, the VR/AR device still conserves power and processing resources that would otherwise have been consumed by the language model (which may consume more power and processing resources than the image model).

In some implementations, as shown in FIG. 2G and by reference number 233, the VR/AR device may receive a command to provide voice assistance. In one example, a user of the VR/AR device may provide input (e.g., using an input component associated with the VR/AR device) that triggers the command. In some implementations, the input comprises interaction with a UI (e.g., received using an input button, a joystick, or a keyboard, among other examples) generated by software executed by the VR/AR device or a voice command received by the VR/AR device (e.g., using a microphone) associated with the VR/AR device.

Based on the command (e.g., in response to the command), the VR/AR device may apply the image model (e.g., as described above) to determine additional string descriptors (e.g., one or more additional string descriptors) for the additional visualization. Alternatively, when the VR/AR device has already applied the image model to the additional visualization (e.g., to calculate the new indicator of change), the VR/AR device may receive (e.g., from a cache associated with the VR/AR device) the additional string descriptors. Furthermore, as shown by reference number 235, the VR/AR device may apply the language model to generate an additional sentence (e.g., at least one additional sentence) that describes the additional visualization.

As shown by reference number 237, the VR/AR device may transmit, and the cloud service may receive, the additional sentence generated by the language model. As shown by reference number 239, the cloud service may apply the text-to-speech model to the additional sentence to generate an additional digital sound signal. As shown by reference number 241, the cloud service may transmit, and the VR/AR device may receive, the additional digital audio signal generated by the text-to-speech model. Although the example 200 is shown with the cloud service applying the text-to-speech model, other examples may include the VR/AR device applying the text-to-speech model (e.g., as shown in FIGS. 1C and 1G).

Figure 2H:
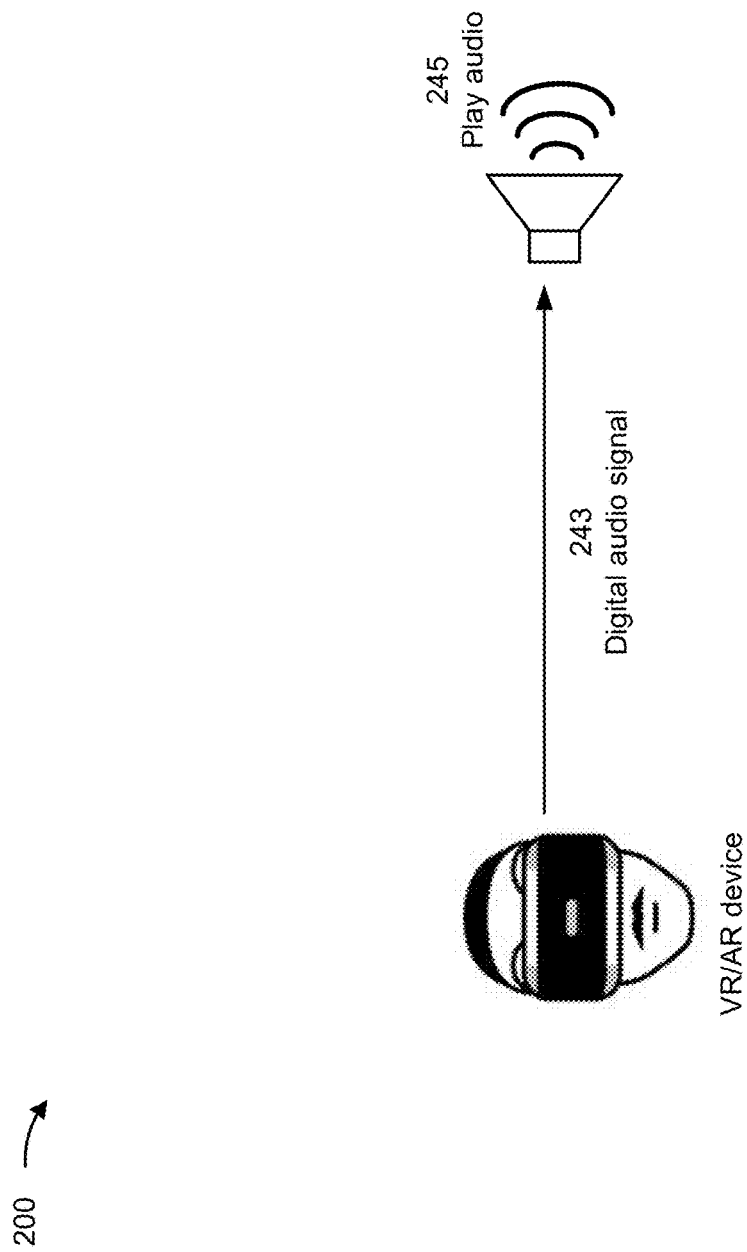

As shown in FIG. 2H and by reference number 243, the VR/AR device may transmit, and an output component associated with the VR/AR device (e.g., a speaker) may receive, the additional digital sound signal generated by the text-to-speech model. Accordingly, as shown by reference number 245, the output component may play additional sound based on the additional digital sound signal. The additional sound thus provides audio assistance to the user of the VR/AR device.

By using techniques as described in connection with FIGS. 2A-2H, the VR/AR device conserves memory overhead by using the image model and the language model in lieu of vast quantities of alternative text. Additionally, in some implementations, the relevance threshold is customizable such that the VR/AR device conserves processing resources and power that would otherwise have been expended provided undesired audio assistance.

As indicated above, FIGS. 2A-2H are provided as an example. Other examples may differ from what is described with regard to FIGS. 2A-2H.

Figure 3A:
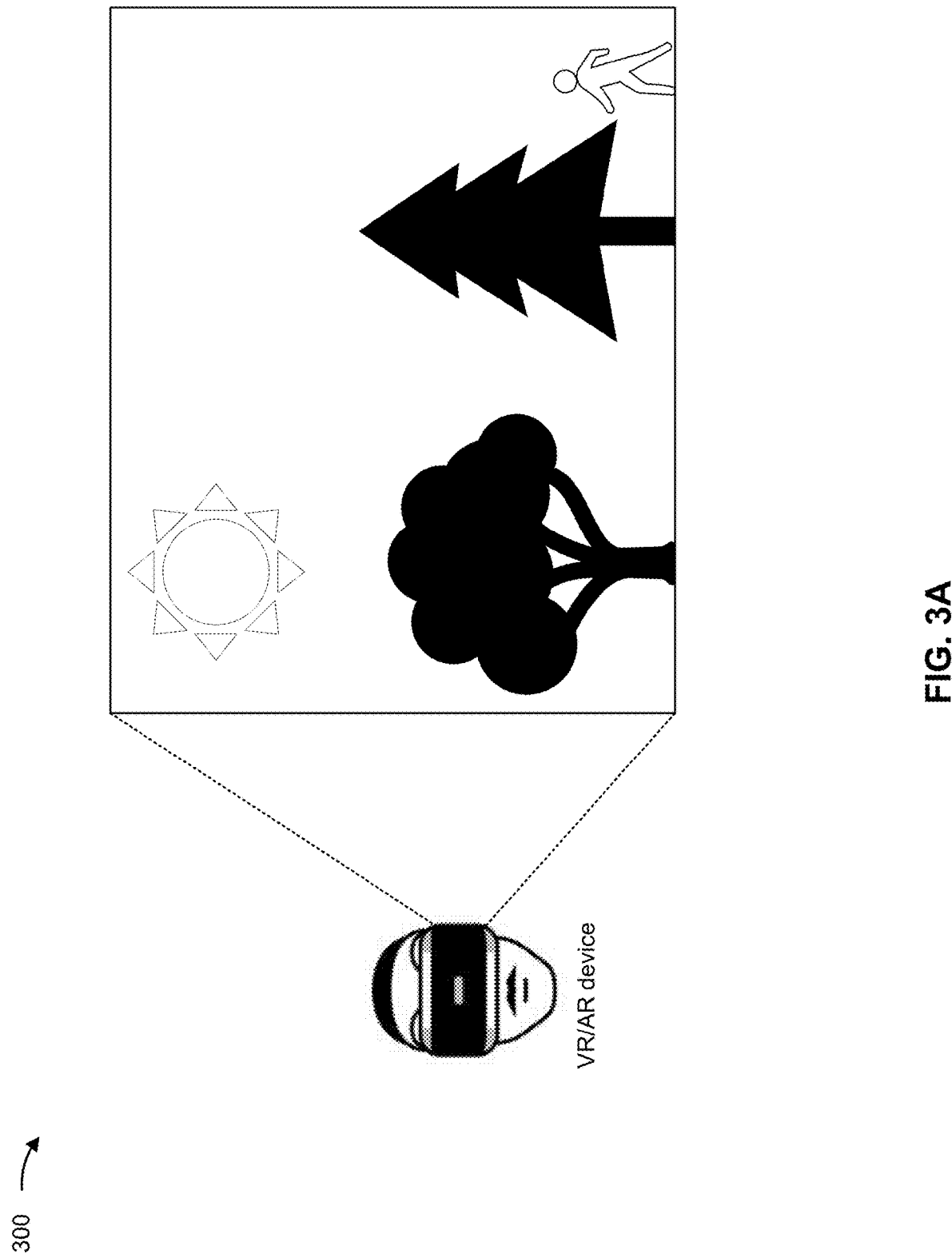
FIGS. 3A-3C are diagrams of examples relating to changes in a VR environment, in accordance with some embodiments of the present disclosure.
Figure 3B:
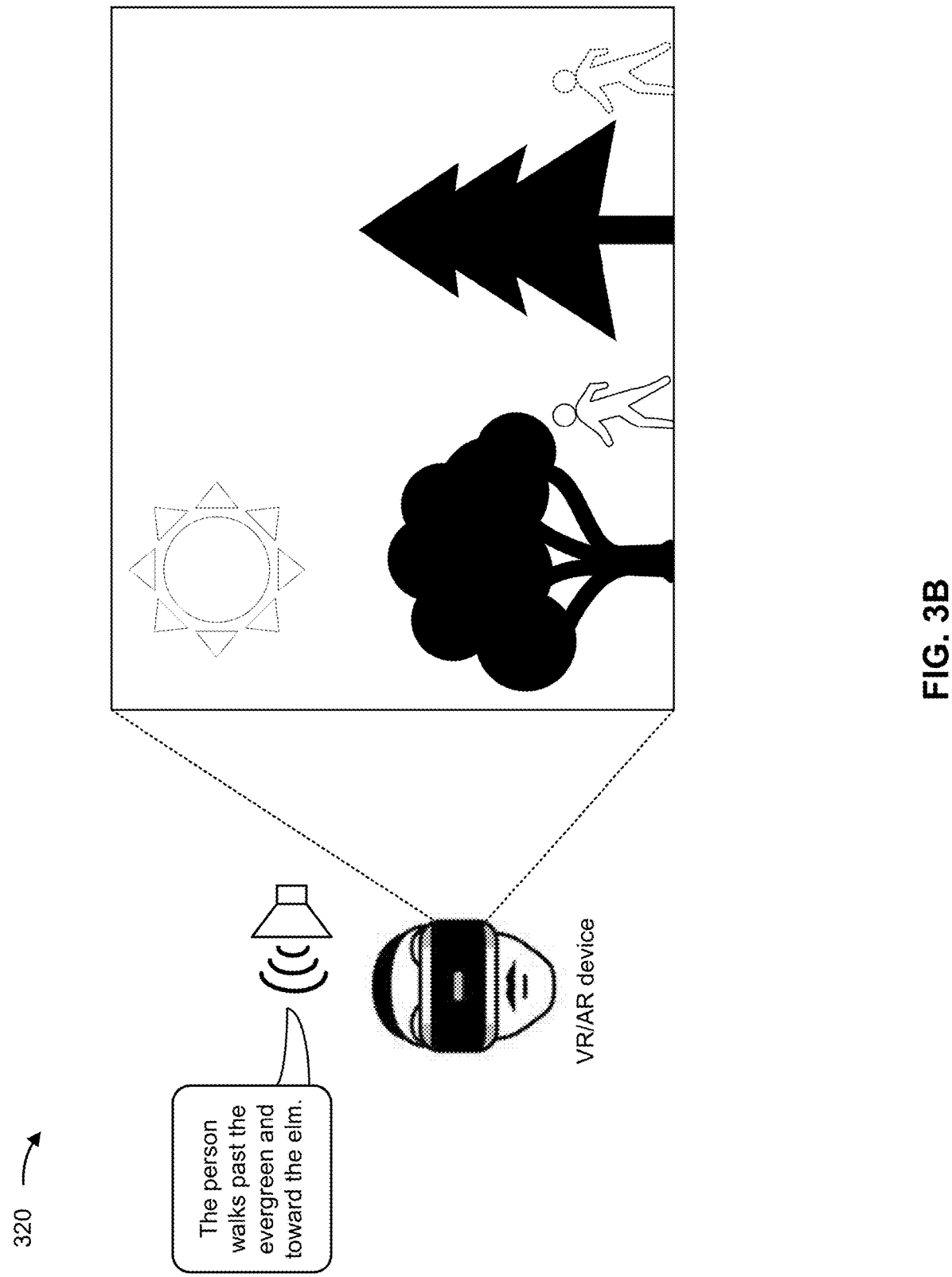
Figure 3C:
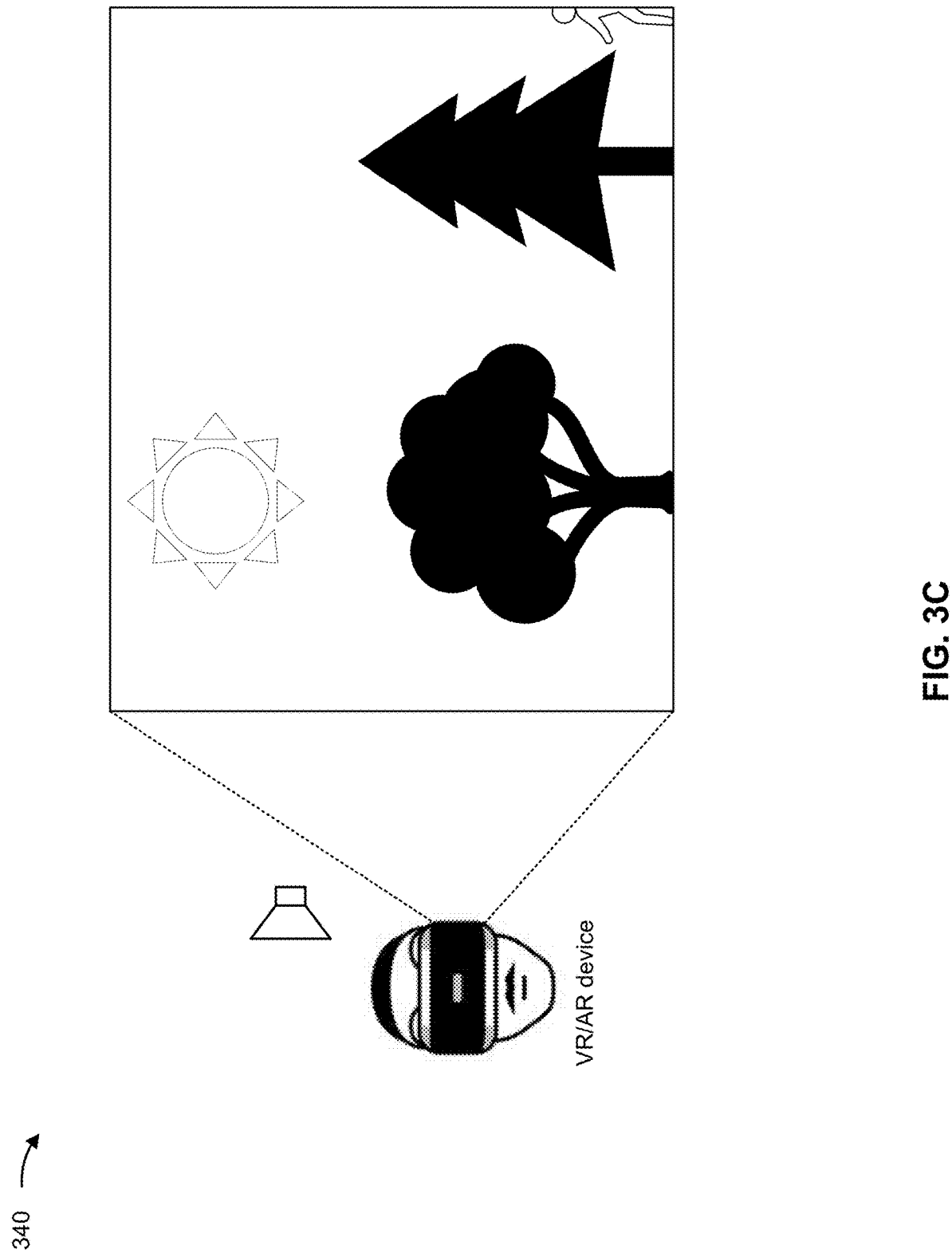

FIGS. 3A, 3B, and 3C are diagrams of examples 300, 320, and 340, respectively, associated with changes in a VR environment. Examples 300, 320, and 340 include a VR environment that may be displayed using a VR/AR device. This device is described in more detail in connection with FIGS. 4 and 5.

As shown in FIG. 3A, the example 300 includes a VR/AR environment with the sun, two trees, and a person. For example, the VR/AR environment of FIG. 3A may be a park setting. As shown in FIG. 3B, the VR/AR environment of the example 320 has changed because the person has moved. Accordingly, as described in connection with FIG. 2C, the VR/AR device (or a cloud service, as described in connection with FIG. 1C) may determine that an indicator of change from the example 300 to the example 320 satisfies a relevance threshold. Therefore, as further shown in FIG. 3B, the VR/AR device (or the cloud service) may generate a sentence for conversion to a digital audio signal (and ultimately to sound). The sentence may provide audio assistance to a user of the VR/AR device (e.g., by describing movement of the person, as shown in FIG. 3B)

On the other hand, as shown in FIG. 3C, the VR/AR environment of the example 340 has changed because the user of the VR/AR device has swiveled her/his head (so that the displayed scene is slightly shifted). Accordingly, as described in connection with FIG. 2F, the VR/AR device (or a cloud service, as described in connection with FIG. 1F) may determine that an indicator of change from the example 300 to the example 340 fails to satisfy the relevance threshold. Therefore, as further shown in FIG. 3C, the VR/AR device (or the cloud service) may refrain from generating a sentence and thus refrain from providing audio assistance to a user of the VR/AR device.

By using techniques as described in connection with FIGS. 3A-3C, audio assistance may be provided only when an indicator of change satisfies the relevance threshold. As a result, processing resources and power are conserved (whether at the VR/AR device or at the cloud service described herein).

As indicated above, FIGS. 3A-3C are provided as an example. Other examples may differ from what is described with regard to FIGS. 3A-3C.

Figure 4:
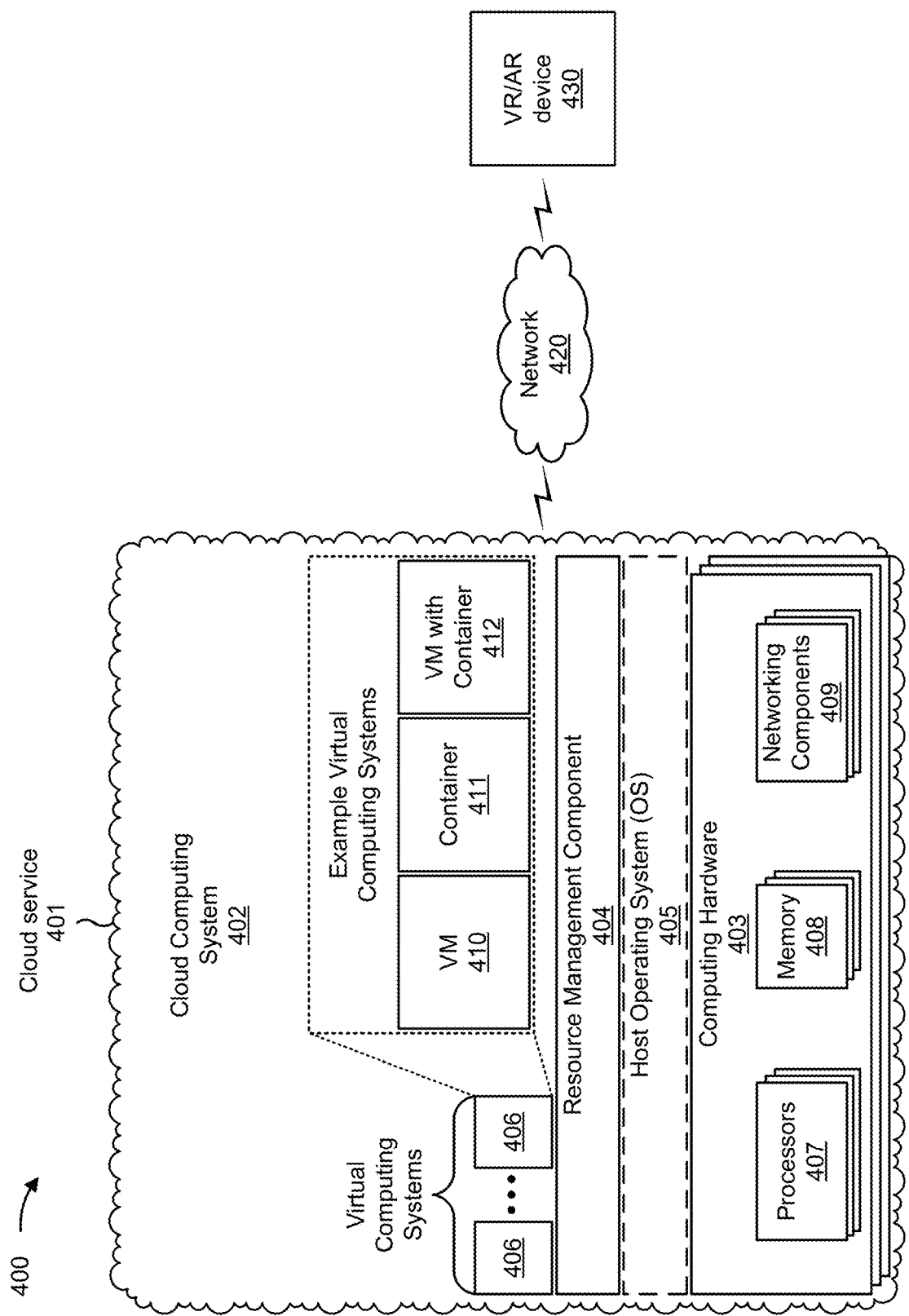
FIG. 4 is a diagram of an example environment in which systems and/or methods described herein may be implemented, in accordance with some embodiments of the present disclosure.

FIG. 4 is a diagram of an example environment 400 in which systems and/or methods described herein may be implemented. As shown in FIG. 4, environment 400 may include a cloud service 401, which may include one or more elements of and/or may execute within a cloud computing system 402. The cloud computing system 402 may include one or more elements 403-412, as described in more detail below. As further shown in FIG. 4, environment 400 may include a network 420 and/or a VR/AR device 430. Devices and/or elements of environment 400 may interconnect via wired connections and/or wireless connections.

The cloud computing system 402 may include computing hardware 403, a resource management component 404, a host OS 405, and/or one or more virtual computing systems 406. The cloud computing system 402 may execute on, for example, an Amazon Web Services platform, a Microsoft Azure platform, or a Snowflake platform. The resource management component 404 may perform virtualization (e.g., abstraction) of computing hardware 403 to create the one or more virtual computing systems 406. Using virtualization, the resource management component 404 enables a single computing device (e.g., a computer or a server) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

The computing hardware 403 may include hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, and/or one or more networking components 409. Examples of a processor, a memory, and a networking component (e.g., a communication component) are described elsewhere herein.

The resource management component 404 may include a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, or another type of hypervisor) or a virtual machine monitor, such as when the virtual computing systems 406 are virtual machines 410. Additionally, or alternatively, the resource management component 404 may include a container manager, such as when the virtual computing systems 406 are containers 411. In some implementations, the resource management component 404 executes within and/or in coordination with a host operating system 405.

A virtual computing system 406 may include a virtual environment that enables cloud-based execution of operations and/or processes described herein using computing hardware 403. As shown, a virtual computing system 406 may include a virtual machine 410, a container 411, or a hybrid environment 412 that includes a virtual machine and a container, among other examples. A virtual computing system 406 may execute one or more applications using a file system that includes binary files, software libraries, and/or other resources required to execute applications on a guest operating system (e.g., within the virtual computing system 406) or the host operating system 405.

Although the cloud service 401 may include one or more elements 403-412 of the cloud computing system 402, may execute within the cloud computing system 402, and/or may be hosted within the cloud computing system 402, in some implementations, the cloud service 401 may not be cloud-based (e.g., may be implemented outside of a cloud computing system) or may be partially cloud-based. For example, the cloud service 401 may include one or more devices that are not part of the cloud computing system 402, such as device 500 of FIG. 5, which may include a standalone server or another type of computing device. The cloud service 401 may perform one or more operations and/or processes described in more detail elsewhere herein.

The network 420 may include one or more wired and/or wireless networks. For example, the network 420 may include a cellular network, a public land mobile network (PLMN), a local area network (LAN), a wide area network (WAN), a private network, the Internet, and/or a combination of these or other types of networks. The network 420 enables communication among the devices of the environment 400.

The VR/AR device 430 may include a device capable of displaying a VR environment or an AR environment. Additionally, or alternatively, the VR/AR device 430 may be capable of playing sound associated with a VR environment or an AR environment. The VR/AR device 430 may include a communication device and/or a computing device. For example, the VR/AR device 430 may include a wireless communication device, a mobile phone, a user equipment, a tablet computer, a wearable communication device (e.g., a smart wristwatch, a pair of smart eyeglasses, a head mounted display, or a virtual reality headset), or a similar type of device.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of the environment 400 may perform one or more functions described as being performed by another set of devices of the environment 400.

Figure 5:
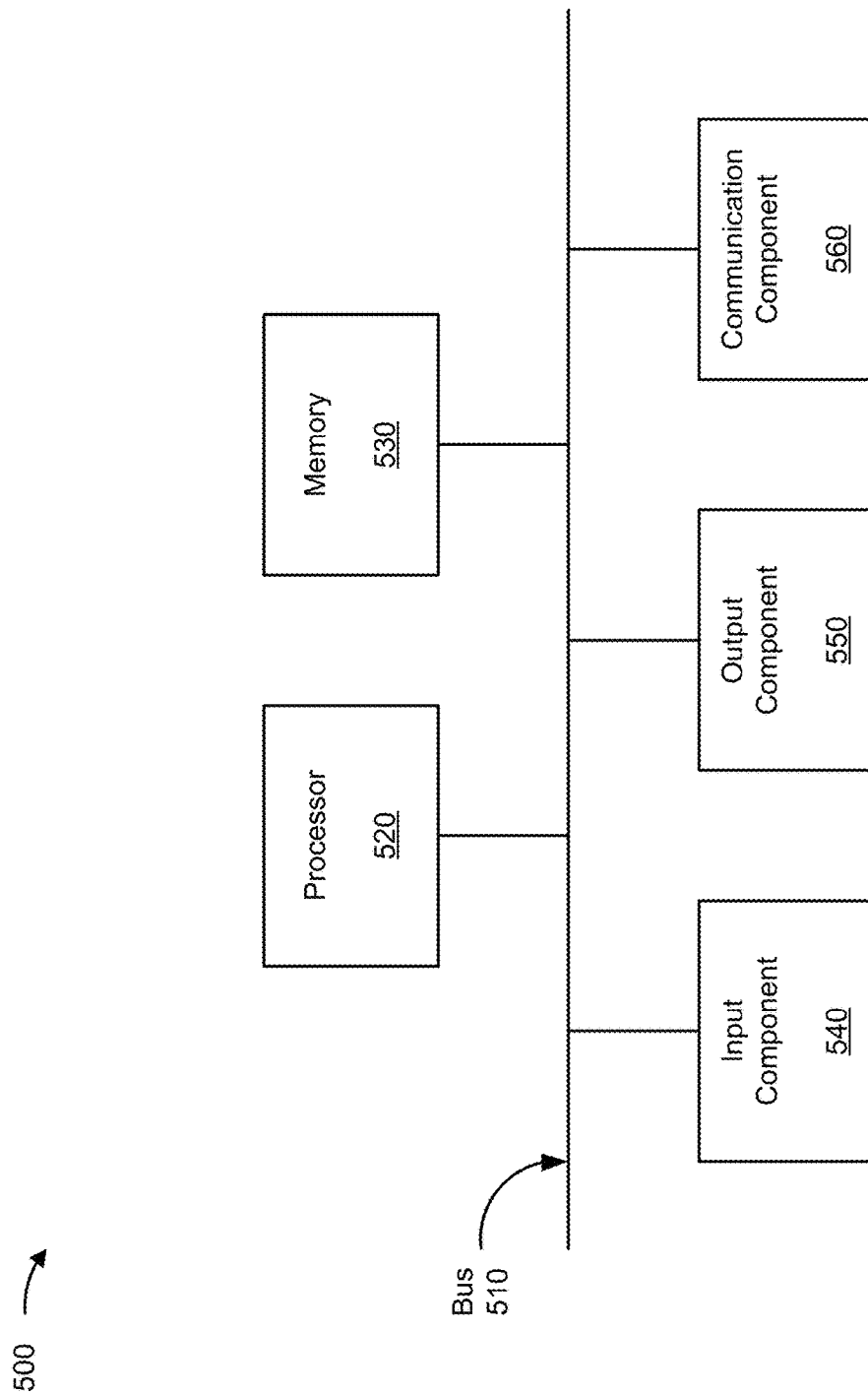
FIG. 5 is a diagram of example components of one or more devices of FIG. 4, in accordance with some embodiments of the present disclosure.

FIG. 5 is a diagram of example components of a device 500 associated with voice assistance in VR environments and AR environments. The device 500 may correspond to the VR/AR device 430. In some implementations, the VR/AR device 430 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
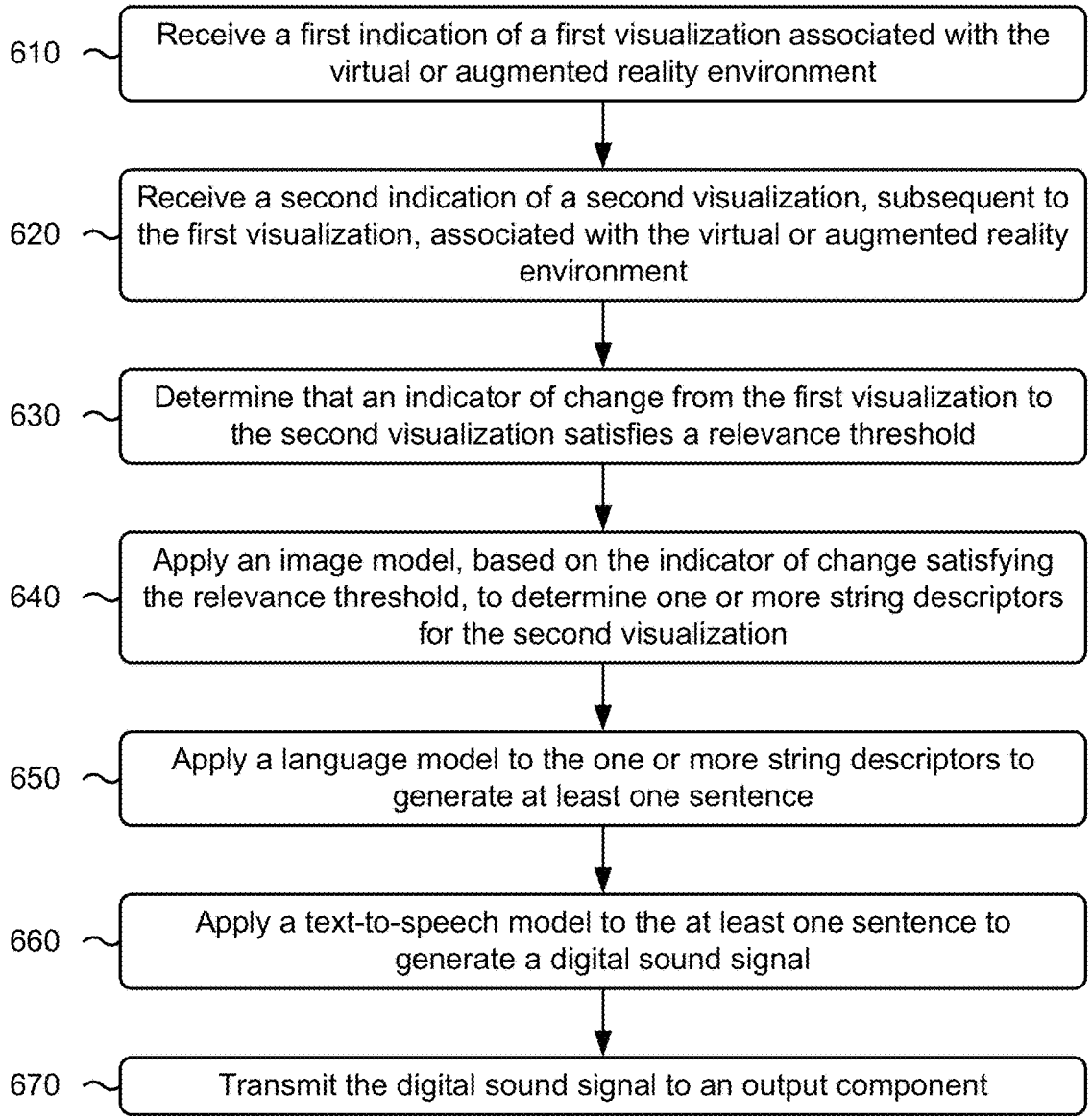
FIG. 6 is a flowchart of an example process relating to voice assistance in VR environments and AR environments, in accordance with some embodiments of the present disclosure.

FIG. 6 is a flowchart of an example process 600 associated with voice assistance in VR environments and AR environments. In some implementations, one or more process blocks of FIG. 6 may be performed by the cloud service 401. In some implementations, one or more process blocks of FIG. 6 may be performed by another device or a group of devices separate from or including the cloud service 401, such as the VR/AR device 430. Additionally, or alternatively, one or more process blocks of FIG. 6 may be performed by one or more components of the device 500, such as processor 520, memory 530, input component 540, output component 550, and/or communication component 560.

As shown in FIG. 6, process 600 may include receiving a first indication of a first visualization associated with the virtual or augmented reality environment (block 610). For example, the cloud service 401 (e.g., using processor 520, memory 530, input component 540, and/or communication component 560) may receive a first indication of a first visualization associated with the virtual or augmented reality environment, as described above in connection with reference number 103 of FIG. 1A. As an example, the first indication may include data encoding the first visualization, such as one or more video frames for display (e.g., an I frame, a P frame, and/or a B frame, among other examples) and/or one or more digital sound signals for playing. In some implementations, the data encoding the first visualization may further include data indicating a spatial and/or temporal order associated with the video frame(s) and/or the digital sound signal(s).

As further shown in FIG. 6, process 600 may include receiving a second indication of a second visualization, subsequent to the first visualization, associated with the virtual or augmented reality environment (block 620). For example, the cloud service 401 (e.g., using processor 520, memory 530, input component 540, and/or communication component 560) may receive a second indication of a second visualization, subsequent to the first visualization, associated with the virtual or augmented reality environment, as described above in connection with reference number 109 of FIG. 1B. As an example, the cloud service may determine the second visualization based on input from a VR/AR device. For example, the cloud service may determine one or more new video frames and/or one or more new digital sound signals based on movement of a user from a previous location to a new location in the VR/AR environment. In another example, the cloud service may determine new video frame(s) and/or new digital sound signal(s) based on interaction with a person or object of the VR/AR environment (e.g., by movement of the user to a distance from the person or object that satisfies a distance threshold and/or by interaction with an input component associated with the VR/AR device, such as pushing a button or entering text with a keyboard).

As further shown in FIG. 6, process 600 may include determining that an indicator of change from the first visualization to the second visualization satisfies a relevance threshold (block 630). For example, the cloud service 401 (e.g., using processor 520 and/or memory 530) may determine that an indicator of change from the first visualization to the second visualization satisfies a relevance threshold, as described above in connection with reference number 111 of FIG. 1C. As an example, the cloud service may calculate the indicator of change as a measurement based on pixel changes from the first visualization to the second visualization. Additionally, or alternatively, the cloud service may apply a motion model to the first visualization and the second visualization to generate the indicator of change. Additionally, or alternatively, the cloud service may apply an image model to the first visualization to generate first string descriptors and to the second visualization to generate second string descriptors such that the indicator of change is based on a difference between the first string descriptors and the second string descriptors. Additionally, or alternatively, the cloud service may determine the indicator of change based on whether the second visualization is associated with an I frame, based on a location (e.g., indicated using in-world coordinates for the VR/AR environment) associated with the second visualization, and/or based on a tag associated with the second visualization.

As further shown in FIG. 6, process 600 may include applying an image model, based on the indicator of change satisfying the relevance threshold, to determine one or more string descriptors for the second visualization (block 640). For example, the cloud service 401 (e.g., using processor 520 and/or memory 530) may apply an image model, based on the indicator of change satisfying the relevance threshold, to determine one or more string descriptors for the second visualization, as described above in connection with FIG. 1C. As an example, the image model may identify objects (e.g., one or more objects) in the second visualization and may therefore generate the one or more string descriptors based on the objects (e.g., by selecting from a database of string descriptors).

As further shown in FIG. 6, process 600 may include applying a language model to the one or more string descriptors to generate at least one sentence (block 650). For example, the cloud service 401 (e.g., using processor 520 and/or memory 530) may apply a language model to the one or more string descriptors to generate at least one sentence, as described above in connection with reference number 113 of FIG. 1C. As an example, the language model may include an NLP model that uses connecting phrases (e.g., a plurality of connecting phrases) to join the one or more string descriptors from the image model into a narrative. Additionally, or alternatively, the language model may include an NLP model that uses abstractive-based summarization to generate new, human-readable text, that incorporates the one or more string descriptors.

As further shown in FIG. 6, process 600 may include applying a text-to-speech model to the at least one sentence to generate a digital sound signal (block 660). For example, the cloud service 401 (e.g., using processor 520 and/or memory 530) may apply a text-to-speech model to the at least one sentence to generate a digital sound signal, as described above in connection with reference number 117 of FIG. 1C. As an example, the text-to-speech model may be included in a DLL, a Java library, or another type of shared library (or shared object). The text-to-speech model may be at least partially integrated with software executed by the VR/AR device or the cloud service. Alternatively, the text-to-speech model may be at least partially integrated with an OS of the VR/AR device or the cloud service, such that the software uses an API call or another type of request to the OS to use the text-to-speech model.

As further shown in FIG. 6, process 600 may include transmitting the digital sound signal to an output component (block 670). For example, the cloud service 401 (e.g., using processor 520, memory 530, and/or communication component 560) may transmit the digital sound signal to an output component, as described above in connection with reference number 119 of FIG. 1D. As an example, the output component may play sound based on the digital sound signal. The sound thus provides audio assistance to the user.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1H, 2A-2H, and/or 3A-3C. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for providing voice assistance in a virtual or augmented reality environment, the system comprising:
    one or more memories; and
    one or more processors, communicatively coupled to the one or more memories, configured to:
        receive a first indication of a first visualization associated with the virtual or augmented reality environment;
        receive a second indication of a second visualization, subsequent to the first visualization, associated with the virtual or augmented reality environment;
        determine that an indicator of change from the first visualization to the second visualization satisfies a relevance threshold;
        apply an image model, based on the indicator of change satisfying the relevance threshold, to determine one or more string descriptors for the second visualization;
        apply a language model to the one or more string descriptors to generate at least one sentence;
        apply a text-to-speech model to the at least one sentence to generate a digital sound signal;
        transmit the digital sound signal to an output component;
        receive a third indication of a third visualization, subsequent to the second visualization, associated with the virtual or augmented reality environment;
        determine that an additional indicator of change from the second visualization to the third visualization fails to satisfy the relevance threshold;
        receive a command to provide voice assistance;
        apply the language model, based on the command to provide voice assistance, to generate at least one additional sentence;
        apply the text-to-speech model to the at least one additional sentence to generate an additional digital sound signal; and
        transmit the additional digital sound signal to the output component.

2. The system of claim 1, wherein the one or more processors, to receive the first indication of the first visualization, are configured to:
    receive the first indication from a server associated with the virtual or augmented reality environment.

3. The system of claim 1, wherein the one or more processors, to determine the indicator of change, are configured to:
    calculate the indicator of change as a measurement based on pixel changes from the first visualization to the second visualization.

4. The system of claim 1, wherein the first indication of the first visualization is a first I frame, and the second indication of the second visualization is a second I frame.

5. The system of claim 1, wherein the one or more processors, to determine the indicator of change, are configured to:
    apply a motion model to the first visualization and the second visualization to generate the indicator of change.

6. The system of claim 1, wherein the one or more processors, to determine the indicator of change, are configured to:
receive a tag associated with the second visualization that includes the indicator of change.

7. The system of claim 1, wherein the one or more processors, to determine the indicator of change, are configured to:
apply the image model to the first visualization to generate one or more first string descriptors;
apply the image model to the second visualization to generate one or more second string descriptors; and
calculate the indicator of change based on the one or more first string descriptors and the one or more second string descriptors.

8. A method of providing voice assistance in a virtual or augmented reality environment, comprising:
receiving, at a device, an indication of a visualization change associated with the virtual or augmented reality environment;
determining, at the device, that a change value, calculated based on the indication of the visualization change, satisfies a relevance threshold;
applying, at the device and based on the indicator of change satisfying the relevance threshold, a description model to determine at least one sentence describing the virtual or augmented reality environment;
applying, at the device, a text-to-speech model to the at least one sentence to generate a digital sound signal;
transmitting, at the device and to an output component, the digital sound signal;
receiving, at the device, an additional indication of a visualization change associated with the virtual or augmented reality environment;
determining, at the device, that an additional change value, calculated based on the additional indication of visualization change, fails to satisfy the relevance threshold;
receiving, at the device, a command to provide voice assistance;
applying, at the device and based on the command to provide voice assistance, the description model to determine at least one additional sentence describing the virtual or augmented reality environment;
applying, at the device, the text-to-speech model to the at least one additional sentence to generate an additional digital sound signal; and
transmitting, at the device and to the output component, the additional digital sound signal.

9. The method of claim 8, wherein receiving the indication of the visualization change comprises:
determining a first visualization for the virtual or augmented reality environment;
receiving input associated with interaction with the virtual or augmented reality environment;
determining a second visualization for the virtual or augmented reality environment based on the input; and
generating the indication of the visualization change based on determining the second visualization.

10. The method of claim 8, wherein the change value comprises an average over a plurality of frames within a time window.

11. The method of claim 8, further comprising:
receiving an indication of a setting associated with a level of voice assistance; and
determining the relevance threshold based on the setting.

12. The method of claim 11, wherein determining the relevance threshold comprises:
selecting the relevance threshold, from a plurality of possible relevance thresholds, based on the setting.

13. The method of claim 8, wherein applying the text-to-speech model to the at least one sentence comprises:
transmitting, to a cloud service implementing the text-to-speech model, the at least one sentence; and
receiving, from the cloud service, the digital sound signal based on the at least one sentence.

14. A non-transitory computer-readable medium storing a set of instructions for providing voice assistance in a virtual or augmented reality environment, the set of instructions comprising:
one or more instructions that, when executed by one or more processors of a device, cause the device to:
display a first visualization associated with the virtual or augmented reality environment;
display a second visualization, subsequent to the first visualization, associated with the virtual or augmented reality environment;
determine that an indicator of change from the first visualization to the second visualization satisfies a relevance threshold;
apply a description model, based on the indicator of change satisfying the relevance threshold, to determine at least one sentence describing the virtual or augmented reality environment;
output, to a user and using an output component, sound based on applying a text-to-speech model to the at least one sentence;
display a third visualization, subsequent to the second visualization, associated with the virtual or augmented reality environment;
determine that an additional indicator of change from the second visualization to the third visualization fails to satisfy the relevance threshold;
receive, from the user and using an input component, a command to provide voice assistance;
apply the description model, based on the command to provide voice assistance, to determine at least one additional sentence describing the virtual or augmented reality environment; and
output, to the user and using the output component, additional sound based on applying the text-to-speech model to the at least one additional sentence.

15. The non-transitory computer-readable medium of claim 14, wherein the one or more instructions, when executed by the one or more processors, further cause the device to:
receive, from the user and using an input component, feedback associated with the sound; and
update the description model based on the feedback.

16. The non-transitory computer-readable medium of claim 14, wherein the indicator of change is determined using a change model, and wherein the one or more instructions, when executed by the one or more processors, further cause the device to:
receive, from the user and using an input component, feedback associated with the sound; and
update the change model based on the feedback.

17. The non-transitory computer-readable medium of claim 14, wherein the one or more instructions, that cause the device to determine that the indicator of change satisfies the relevance threshold, cause the device to:
receive a location associated with the second visualization, wherein the indicator of change is further based on the location.

18. The non-transitory computer-readable medium of claim 14, wherein the one or more instructions, when executed by the one or more processors, further cause the device to:
- receive, from the user and using an input component, a command to provide voice assistance; and
- calculate the indicator of change based on the command to provide voice assistance.

19. The non-transitory computer-readable medium of claim 14, wherein the one or more instructions, that cause the device to display the first visualization, cause the device to:
- receive data encoding the first visualization from a remote server; and
- transmit the data encoding the first visualization to a display.

20. The non-transitory computer-readable medium of claim 14, wherein the virtual or augmented reality environment is a virtual reality environment.

\* \* \* \* \*